US012659974B2

(12) United States Patent
Zhou et al.

(10) Patent No.: US 12,659,974 B2
(45) Date of Patent: Jun. 16, 2026

(54) METHOD AND APPARATUS FOR SL FEEDBACK TRANSMISSION ON UNLICENSED BAND

(71) Applicant: Samsung Electronics Co., Ltd., Gyeonggi-do (KR)

(72) Inventors: Miao Zhou, Beijing (CN); Feifei Sun, Beijing (CN); Sa Zhang, Beijing (CN)

(73) Assignee: Samsung Electronics Co., Ltd (KR)

( * ) Notice: Subject to any disclaimer, the term of this patent is extended or adjusted under 35 U.S.C. 154(b) by 347 days.

(21) Appl. No.: 18/363,294

(22) Filed: Aug. 1, 2023

(65) Prior Publication Data

US 2024/0049253 A1 Feb. 8, 2024

(30) Foreign Application Priority Data

Aug. 2, 2022 (CN) .......................... 202210924086.1

(51) Int. Cl.
*H04W 72/25* (2023.01)
*H04L 1/1829* (2023.01)
*H04W 72/40* (2023.01)

(52) U.S. Cl.
CPC ........... *H04W 72/25* (2023.01); *H04L 1/1854* (2013.01); *H04W 72/40* (2023.01)

(58) Field of Classification Search
None
See application file for complete search history.

(56) References Cited

U.S. PATENT DOCUMENTS

| | | | |
|---|---|---|---|
| 2021/0336728 A1 | 10/2021 | Selvanesan et al. | |
| 2021/0377989 A1 | 12/2021 | Chae et al. | |
| 2022/0046628 A1 | 2/2022 | Ji et al. | |
| 2022/0191851 A1* | 6/2022 | Park ...................... | H04W 92/18 |
| 2022/0240260 A1 | 7/2022 | Zhou et al. | |
| 2023/0064680 A1* | 3/2023 | Huang .............. | H04W 74/0816 |
| 2023/0164820 A1* | 5/2023 | Talarico ................ | H04W 72/12 |
| | | | 370/329 |

(Continued)

FOREIGN PATENT DOCUMENTS

| | | |
|---|---|---|
| WO | WO 2020/210333 | 10/2020 |
| WO | WO 2022/036703 | 2/2022 |

(Continued)

OTHER PUBLICATIONS

European Search Report dated Mar. 21, 2025 issued in counterpart application No. 23850397.3-1206, 9 pages.

(Continued)

*Primary Examiner* — Phirin Sam
(74) *Attorney, Agent, or Firm* — The Farrell Law Firm, P.C.

(57) ABSTRACT

The disclosure relates to a 5G or 6G communication system for supporting a higher data transmission rate. The present disclosure provides a first user equipment (UE) and a second UE, and methods performed by the first UE and the second UE in a wireless communication system. The method performed by the first UE in the communication system includes transmitting, to the second UE, a first signalling for indicating information of a resource, or receiving, from the second UE, a second signalling for indicating the information of the resource; and on the resource, receiving a feedback signalling from the second UE.

20 Claims, 13 Drawing Sheets

TRANSMITTING TO THE SECOND UE A SIGNALING FOR INDICATING INFORMATION OF A RESOURCE, WHEREIN THE RESOURCE IS USED BY THE SECOND UE TO SEND A FEEDBACK SIGNALLING TO THE FIRST UE

610

RECEIVING THE FEEDBACK SIGNALLING FROM THE SECOND UE

630

(56) References Cited

U.S. PATENT DOCUMENTS

| | | | | |
|---|---|---|---|---|
| 2025/0142595 A1* | 5/2025 | Deng | .................. | H04L 27/2607 |
| 2025/0254711 A1* | 8/2025 | Lee | ........................... | H04L 5/00 |
| 2025/0254721 A1* | 8/2025 | Chien | .................. | H04W 72/25 |
| 2025/0287423 A1* | 9/2025 | Wang | ................... | H04L 5/0044 |

FOREIGN PATENT DOCUMENTS

| | | |
|---|---|---|
| WO | WO 2022/073010 | 4/2022 |
| WO | WO 2022/073214 | 4/2022 |

OTHER PUBLICATIONS

International Search Report dated Nov. 22, 2023 issued in counterpart application No. PCT/KR2023/011240, 7 pages.

* cited by examiner

116

```
         ┌──────────────────────────────────────────────────────────┐
         │                                                          │
         │   330           325                  310    305          │
         │  ┌────────┐   ┌──────────┐        ┌──────────┐           │
         │  │        │   │    RX    │        │    RF    │           │
         │  │SPEAKER │◄──│PROCESSING│◄───────│TRANSCEIVER│          │
         │  │        │   │ CIRCUIT  │        │          │           │
         │  └────────┘   └──────────┘        └──────────┘           │
         │                                                          │
         │   320           315                                      │
         │  ┌────────┐   ┌──────────┐                               │
         │  │        │   │    TX    │                               │
         │  │MICROPHONE│─►│PROCESSING│                              │
         │  │        │   │ CIRCUIT  │                               │
         │  └────────┘   └──────────┘                               │
         │                                                          │
         │   345              340              350                  │
         │  ┌────────┐   ┌──────────┐        ┌──────────┐           │
         │  │        │   │          │        │          │           │
         │  │ I/O IF │◄─►│PROCESSOR │◄───────│  INPUT   │           │
         │  │        │   │          │        └──────────┘           │
         │  └────────┘   └──────────┘        ┌──────────┐           │
         │                    │              │ DISPLAY  │           │
         │                    │              └──────────┘           │
         │                    │                     355             │
         │                360 │                                     │
         │              ┌──────────────────┐                        │
         │              │     MEMORY       │                        │
         │              │  ┌────────────┐  │  361                   │
         │              │  │ OPERATING  │  │                        │
         │              │  │  SYSTEM    │  │                        │
         │              │  └────────────┘  │                        │
         │              │  ┌────────────┐  │  362                   │
         │              │  │APPLICATION │  │                        │
         │              │  └────────────┘  │                        │
         │              └──────────────────┘                        │
         └──────────────────────────────────────────────────────────┘
```

FIG.3A

Figure 6:
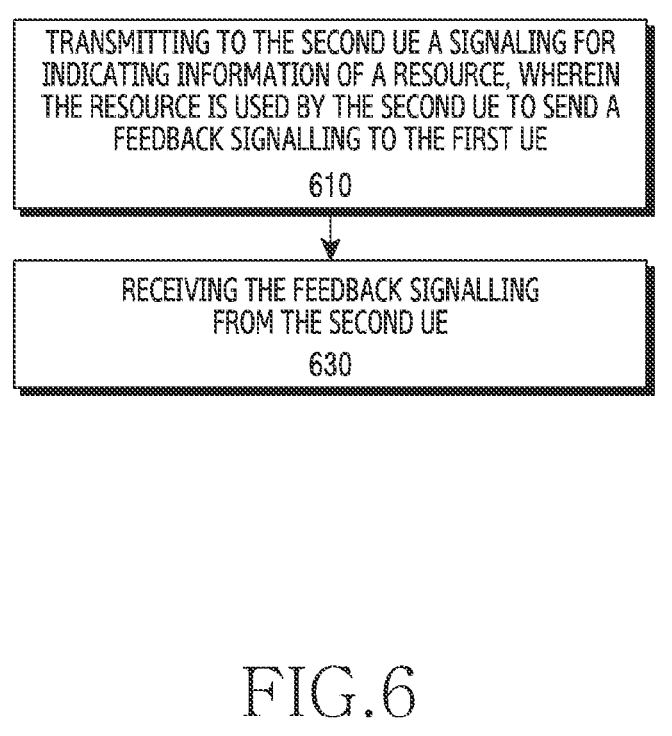

TRANSMITTING TO THE SECOND UE A SIGNALING FOR
INDICATING INFORMATION OF A RESOURCE, WHEREIN
THE RESOURCE IS USED BY THE SECOND UE TO SEND A
FEEDBACK SIGNALLING TO THE FIRST UE

610

RECEIVING THE FEEDBACK SIGNALLING
FROM THE SECOND UE

TRANSMITTING A PSSCH TO THE SECOND UE, AND INDICATING INFORMATION RELATED TO A HARQ-ACK FEEDBACK GROUP AND/OR INFORMATION RELATED TO A HARQ-ACK FEEDBACK IN SCI ASSOCIATED WITH THE PSSCH
710

INDICATING INFORMATION OF A RESOURCE BASED ON THE GROUP
730

RECEIVING A FEEDBACK SIGNALLING FROM THE SECOND UE ON THE INDICATED RESOURCE
750

Figure 8:
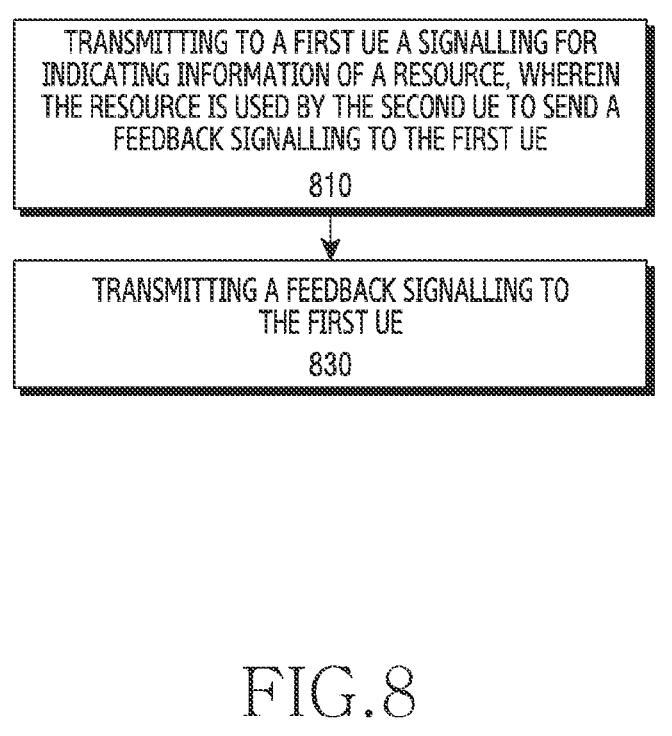

TRANSMITTING TO A FIRST UE A SIGNALLING FOR
INDICATING INFORMATION OF A RESOURCE, WHEREIN
THE RESOURCE IS USED BY THE SECOND UE TO SEND A
FEEDBACK SIGNALLING TO THE FIRST UE

810

TRANSMITTING A FEEDBACK SIGNALLING TO
THE FIRST UE

Figure 9:
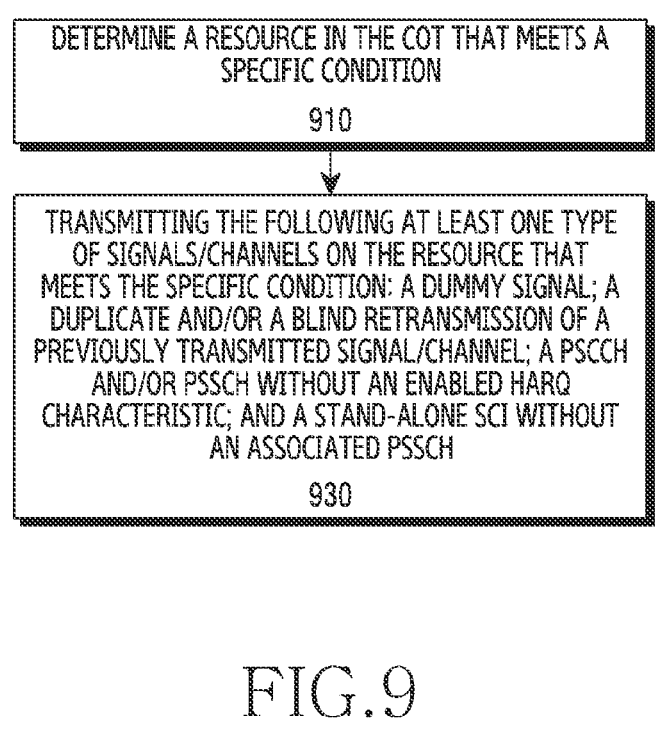

DETERMINE A RESOURCE IN THE COT THAT MEETS A
SPECIFIC CONDITION

910

TRANSMITTING THE FOLLOWING AT LEAST ONE TYPE
OF SIGNALS/CHANNELS ON THE RESOURCE THAT
MEETS THE SPECIFIC CONDITION: A DUMMY SIGNAL; A
DUPLICATE AND/OR A BLIND RETRANSMISSION OF A
PREVIOUSLY TRANSMITTED SIGNAL/CHANNEL; A PSCCH
AND/OR PSSCH WITHOUT AN ENABLED HARQ
CHARACTERISTIC; AND A STAND-ALONE SCI WITHOUT
AN ASSOCIATED PSSCH

METHOD AND APPARATUS FOR SL FEEDBACK TRANSMISSION ON UNLICENSED BAND

CROSS-REFERENCE TO RELATED APPLICATION(S)

This application is based on and claims priority under 35 U.S.C. § 119 to Chinese Patent Application No. 202210924086.1, which was filed in the Chinese Intellectual Property Office on Aug. 2, 2022, the entire disclosure of which is incorporated herein by reference.

BACKGROUND

1. Field

This application relates to the field of wireless communication technology, and in particular, to a method and a device for transmitting a sidelink (SL) feedback signalling in a wireless communication system in the fifth generation new radio (5G NR) access technology system.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

As described above, according to the development of wireless communication systems, open-source tools and hacking techniques enabling easy manufacture of false base stations and mobile communication terminals have also appeared. Through the development of such techniques, it has become easier for an aggressor to perform a denial-of-service (DoS) attack against a user and a communication service provider by using a false base station. Therefore, a method for preventing a DoS attack from a false base station is required.

SUMMARY

According to an embodiment, a method performed by a first user equipment UE in a communication system is provided. The method may include transmitting, to a second UE, a first signalling for indicating information of a resource, or receiving, from the second UE, a second signalling for indicating the information of the resource; and on the resource, receiving a feedback signalling from the second UE.

In some implementations, in the foregoing method performed by the first UE, when a first condition is met, transmitting the first signalling for indicating the information of the resource to the second UE; and/or when the first condition is met, receiving the second signalling from the second UE; and/or when the first condition is met, acquiring the information of the resource from the second signalling sent by the second UE.

In some implementations, in the foregoing method performed by the first UE, the first condition may include at least one of the following: a feature of dynamically indicating a feedback resource is configured and/or enabled for the first UE and/or the second UE; and/or the first UE and/or the second UE indicates configuration and/or enablement of the feature; the first UE and/or second UE operates on an unlicensed band; the first UE and/or second UE is not configured to be able to use a short control signalling (SCS), and/or the first UE and/or the second UE is configured not to be able to use the SCS; the feedback signalling and/or data corresponding to the feedback signalling is transmitted on an unlicensed band; a position of an physical sidelink shared channel (PSSCH) corresponding to the feedback signalling is later than a specific time and/or a gap from the position of the PSSCH to the end of a channel occupancy time (COT) does not exceed a specific length; a position of a physical sidelink feedback channel (PSFCH) to which the PSSCH corresponding to the feedback signalling is mapped through a predetermined rule exceeds the end position of the COT; the position of the PSFCH to which the PSSCH corresponding to the feedback signalling is mapped through the predetermined rule exceeds the end position of the COT, and a gap between the position of the PSFCH and the end position of the COT conforms to a predetermined threshold range; and the PSSCH corresponding to the feedback signalling cannot acquire a corresponding PSFCH resource in the COT through mapping based on a method on an licensed band.

In some implementations, in the foregoing method performed by the first UE, when the first condition is not met, the resource may be determined using a method on the licensed band.

In some implementations, in the foregoing method performed by the first UE, the feedback signalling may at least include: a hybrid automatic repeat request-acknowledgment (HARQ-ACK) information corresponding to a physical sidelink shared channel (PSSCH) sent by the first UE to the second UE.

In some implementations, in the foregoing method performed by the first UE, the PSSCH may include a PSSCH associated with the signalling for indicating the information of the resource.

In some implementations, in the foregoing method performed by the first UE, the feedback signalling may further include: HARQ-ACK information corresponding to at least one another PSSCH transmitted by the first UE to the second UE, the at least one another PSSCH includes at least one PSSCH transmitted before the PSSCH and/or will be transmitted after the PSSCH.

In some implementations, in the foregoing method performed by the first UE, information indicated in the feedback signalling may include at least one of the following: hybrid automatic repeat request-acknowledgment (HARQ-ACK) information corresponding to each or at least one PSCCH indicated in the physical sidelink control channel PSCCH and/or sidelink control information (SCI) associated with the physical sidelink shared channel (PSSCH) sent by the first UE to the second UE; HARQ-ACK information for a PSSCH group to which the PSSCH sent by the first UE to the second UE belongs; HARQ-ACK information for each or at least one PSSCH groups indicated in the PSCCH and/or SCI associated with the PSSCH sent by the first UE to the second UE, wherein the PSSCH sent by the first UE to the second UE includes a PSSCH associated with the signalling for indicating the information of the resource; HARQ-ACK information corresponding to each or at least one sidelink HARQ process of the second UE; HARQ-ACK information corresponding to each or at least one PSSCH sent by the first UE to the second UE.

In some implementations, in the foregoing method performed by the first UE, the information of the resource may be included in the sidelink control information (SCI), and a manner for using the resource may be distinguished by at least one of the following: a SCI format; a field for indicating the resource used by the second UE to transmit the feedback signalling to the first UE; a type of the resource indicated in the SCI.

In some implementations, in the foregoing method performed by the first UE, the manner for using the resource may include using the resource as at least one of the following: a transmission resource reserved for the first UE, a resource indicated in inter-UE collaboration information, a resource for transmitting the feedback signalling by the second UE to the first UE.

In some implementations, in the foregoing method performed by the first UE, the SCI may include at least one of the following: SCI associated with at least one PSSCH corresponding to the feedback signalling; SCI associated with another PSSCH not corresponding to the feedback signalling; and stand-alone SCI.

In some implementations, in the foregoing method performed by the first UE, the information of the resource may include that the resource is used for transmitting a feedback signalling corresponding to which PSSCHs; and/or the information of the resource may be predetermined and/or configured and/or indicated by the sidelink control information (SCI).

In some implementations, in the foregoing method performed by the first UE, when HARQ-ACK information corresponding to at least one PSSCH is indicated in the feedback signalling, a manner for indicating the information may include at least one of the following: HARQ-ACK information corresponding to the at least one of the PSSCH is indicated by a 1-bit information; and HARQ-ACK information corresponding to the at least one PSSCH is indicated by a codebook.

In some implementations, in the foregoing method performed by the first UE, when the at least one PSSCH includes more than one PSSCH, the manner for indicating the information may include at least one of the following: bundled HARQ-ACK information corresponding to the at least one PSSCH is indicated by a 1-bit information; HARQ-ACK information corresponding to the last PSSCH in the at least one PSSCH is indicated by a 1-bit information.

In some implementations, in the foregoing method performed by the first UE, the codebook may include at least one of the following: a semi-static codebook generated based on ordering of PSSCH resources, which is ordered by time-frequency position; a dynamic codebook generated based on sidelink allocation indicators (SAI); a one-shot feedback codebook generated based on HARQ process numbers; a codebook corresponding to a group in which a PSSCH associated with the signalling for indicating the information of the resource is located, and generated based on a PSSCH group indication.

In some implementations, in the foregoing method performed by the first UE, the feedback signalling may indicate the HARQ-ACK information by at least one of a sequence and SCI.

In some implementations, in the foregoing method performed by the first UE, the information of the resource may include at least one of the following: a slot in which the resource is located; an index of a subchannel in which the resource is located; an index of a physical resource block (PRB) of the resource; a time domain and/or frequency domain position of at least one physical sidelink shared channel (PSSCH) resource; a time domain and/or frequency domain position of at least one physical sidelink control channel (PSCCH) resource; and a time domain and/or frequency domain position of at least one physical sidelink feedback channel (PSFCH) resource.

In some implementations, in the foregoing method performed by the first UE, the resource may include at least one of the following: a resource within the current channel occupancy time (COT); a resource outside the current COT; a resource within another COT; a resource within N starting slots of the COT.

In some implementations, in the foregoing method performed by the first UE, when the resource is a resource within another COT, only a logical slot and/or a slot within COTs is calculated when calculating a time gap between the signalling for indicating the information of the resource and the feedback signalling.

In some implementations, in the foregoing method performed by the first UE, the slot within COTs may be a slot in a COT initiated by the first UE and/or a slot within a COT shared to the first UE.

In some implementations, in the foregoing method performed by the first UE, if there are other transmissions and/or other receptions at the position of the resource, at least one of the following may be applied: the other resource transmissions and/or other receptions using resources determined by a mapping rule are preferred; and based on priority, a transmission and/or reception of a signalling whose priority is not the highest is dropped.

In some implementations, in the foregoing method performed by the first UE, the feedback signalling may include at least one of the following: a feedback signalling transmitted on a resource determined according to a mapping rule on a licensed band; and a feedback signalling transmitted on a resource determined according to a signalling from the first UE.

In some implementations, in the foregoing method performed by the first UE, when the feedback signalling includes both the feedback signalling transmitted on the resource determined according to the mapping rule on the licensed band, and the feedback signalling transmitted on the resource determined according to the signalling from the first UE, at least one of the following may be used: wherein a 1-bit feedback is indicated on the resource determined according to the mapping rule on the licensed band, wherein the feedback is any of the following: a feedback for a PSSCH transmitted on a PSSCH resource corresponding to the resource, a bundled feedback corresponding to all feedback information that needs to be provided to the first UE; and/or 1-bit or N-bit feedback is indicated on the resource determined according to a signalling from the first UE, wherein the feedback is any of the following: a bundled feedback corresponding to all feedback information that needs to be provided to the first UE, a codebook corresponding to all feedback information that needs to be provided to the first UE.

In some implementations, the foregoing method performed by the first UE may further include: transmitting a PSSCH to the second UE, and indicating information related to a HARQ-ACK feedback group in SCI associated with the PSSCH, wherein the information may include at least one of the following: a PSSCH group indication; a sidelink-new feedback indication; and an indication of a request for a simultaneous feedback for multiple PSSCH groups.

In some implementations, the foregoing method performed by the first UE may further include: transmitting a PSSCH to the second UE, and indicating information related to a HARQ-ACK feedback in SCI associated with the PSSCH. The information may include at least one of the following: whether a mapping rule on a licensed band is used to determine the resource for transmitting the HARQ-ACK feedback; whether a signalling from the first UE is used to determine the resource for transmitting the HARQ-ACK feedback; and for a current PSSCH group and/or each PSSCH group and/or at least one PSSCH group for feedback, whether at least one of the above is used to determine the resource for transmitting the HARQ-ACK feedback.

In some implementations, the foregoing method performed by the first UE may further include: transmitting the following at least one type of signals and/or channels to the second UE on a resource in the channel occupancy time (COT) that meets a specific condition: a dummy signal; a duplicate of a previously transmitted signal and/or channel; a blind retransmission of a previously transmitted signal and/or channel; a PSCCH and/or PSSCH without an enabled HARQ feature; stand-alone SCI without an associated PSSCH.

In some implementations, the foregoing method performed by the first UE may further include: on the resource that meets the specific condition in the COT, no other types of signals and/or channels other than the at least one type of signals and/or channels can be transmitted.

According to an embodiment, a method performed by a second UE is also provided. The method may include receiving, from a first UE, a first signalling for indicating information of a resource, or transmitting, to a first UE, a second signalling for indicating the information of the resource; and on the resource, transmitting a feedback signal to the first UE.

In some implementations, in the foregoing method performed by the second UE, when a second condition is met, transmitting to the first UE the second signalling for indicating the information of the resource; and/or when the second condition is met, receiving the first signalling from the first UE; and/or when the second condition is met, acquiring the information of the resource from the first signalling sent by the first UE.

In some implementations, in the foregoing method performed by the second UE, the second condition may include at least one of the following: a feature of dynamically indicating a feedback resource is configured and/or enabled for the first UE and/or the second UE; and/or configuration and/or enablement of the feature is indicated; the first UE and/or second UE operates on an unlicensed band; the first UE and/or second UE is not configured to be able to use a short control signalling (SCS); the feedback signalling and/or data corresponding to the feedback signalling is transmitted on an unlicensed band; the position of an physical sidelink shared channel (PSSCH) corresponding to the feedback signalling is later than a specific time and/or a gap from the position of the PSSCH to the end of channel occupancy time (COT) is not more than a specific length; the position of a physical sidelink feedback channel (PSFCH) to which the PSSCH corresponding to the feedback signalling is mapped through a predetermined rule exceeds the end position of the COT; the position of the PSFCH to which the PSSCH corresponding to the feedback signalling is mapped through a predetermined rule exceeds the end position of the COT, and a gap between the position of the PSFCH and the end position of COT conforms to a predetermined threshold range; the PSSCH corresponding to the feedback signalling cannot acquire the corresponding PSFCH resource in the COT through mapping based on a method on an licensed band; the feedback signalling includes hybrid automatic repeat request-acknowledgment (HARQ-ACK) information and/or includes at least one negative acknowledgment (NACK); the second UE fails to receive a PSSCH of the first UE and feeds back the NACK, but fails to receive a retransmission of the PSSCH; a type of HARQ-ACK corresponding to the feedback signalling is a specific type.

According to an embodiment, a user equipment (UE) is also provided. The UE may include a transceiver for transmitting and receiving signals; and a controller coupled to the transceiver, and the controller is configured to perform the methods performed by the first UE and/or the second UE as described above.

BRIEF DESCRIPTION

The above and other aspects, features, and advantages of the disclosure will be more apparent from the following detailed description when taken in conjunction with the accompanying drawings, in which:

FIG. 3A illustrates a UE according to an embodiment;

FIG. 6 illustrates a flowchart of a method performed by a UE according to an embodiment;

FIG. 8 illustrates a flowchart of a method performed by a UE according to an embodiment;

FIG. 9 illustrates a flowchart of a method performed by a UE according to an embodiment;

DETAILED DESCRIPTION

Figure 1:
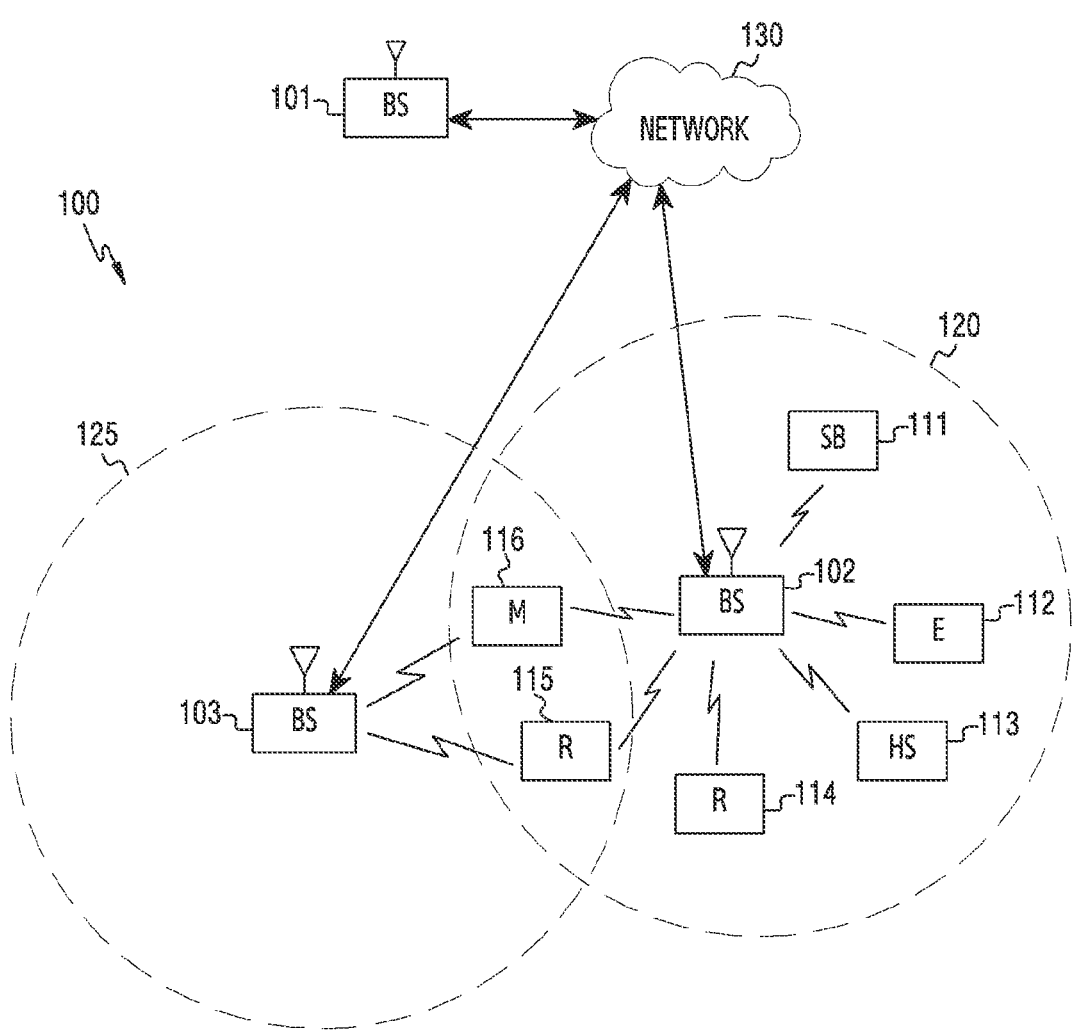
FIG. 1 illustrates a wireless network according to various embodiments.

In order to meet the increasing demand for wireless data communication services since the deployment of 4G communication systems, efforts have been made to develop improved 5G or pre-5G communication systems. Therefore, 5G or pre-5G communication systems are also called "beyond 4G networks" or "post-LTE systems".

In order to achieve a higher data rate, 5G communication systems are implemented in higher frequency (millimeter, mmWave) bands, e.g., 60 GHz bands. In order to reduce propagation loss of radio waves and increase transmission distance thereof, technologies such as beamforming, massive multiple-input multiple-output (MIMO), FD-MIMO, array antenna, analog beamforming and large-scale antenna are discussed in 5G communication systems.

In addition, in 5G communication systems, developments for system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, or the like.

In 5G systems, hybrid frequency shift keying (FSK) and quadrature amplitude modulation (QAM) (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

The following description with reference to the accompanying drawings is provided to facilitate a comprehensive understanding of various embodiments of the present disclosure as defined by the claims and equivalents thereof. Details included herein are provided for better understanding but should be regarded as examples only. Accordingly, those of ordinary skill in the art may understand that various changes and modifications may be made to various embodiments described herein without departing from the scope and spirit of the present disclosure. In addition, well-known functions and constructions may not be described for clarity and conciseness.

The terms and expressions used in the following description and claims are not limited to their dictionary meanings. Instead, they are merely used to enable a clear and consistent understanding of the present disclosure. Accordingly, it should be apparent to those skilled in the art that the following description of various embodiments of the present disclosure is provided for illustration purposes only and not for limiting the scope of the present disclosure as defined by the appended claims and equivalents thereof.

It should be understood that the singular forms "a", "an" and "the" also include plural referents, unless the context clearly dictates otherwise. Thus, for example, reference to "a component surface" includes reference to one or more of such surfaces.

The terms "including" or "may include" refer to presence of a function, an operation, or a component that may be disclosed in various embodiments of the present disclosure, rather than limiting the presence of one or more additional functions, operations, or features. Furthermore, the terms "comprising" or "having" may be interpreted to mean certain features, numbers, steps, operations, constituent elements, components, or combinations thereof, but should not be interpreted as excluding the possibility of existence of one or more other features, numbers, steps, operations, constituent elements, components, or combinations thereof.

The term "or" as used in various embodiments of the present disclosure includes any of the listed terms and all combinations thereof. For example, "A or B" may include A, may include B, or may include both A and B.

Unless otherwise defined, all terms (including technical or scientific terms) used in the present disclosure have the same meaning as understood by a person of ordinary skill in the art described in the present disclosure. Common terms as defined in dictionaries should be interpreted to have meanings consistent with the context in the relevant technical field, and should not be interpreted ideally or overly formalized, unless explicitly so defined in the present disclosure.

FIG. 1 illustrates an example wireless network 100 according to various embodiments. The embodiment of the wireless network 100 shown in FIG. 1 is for illustration only. Other embodiments of the wireless network 100 may be used without departing from the scope of the present disclosure.

The wireless network 100 includes a gNodeB (gNB) 101, a gNB 102, and a gNB 103. The gNB 101 communicates with the gNB 102 and the gNB 103. The gNB 101 further communicates with at least one Internet Protocol (IP) network 130, such as the Internet, a private IP network, or other data networks.

Depending on the type of the network, other well-known terms such as "base station" or "access point" may be used instead of "gNodeB" or "gNB". For convenience, the terms "gNodeB" and "gNB" are used herein to refer to a network infrastructure component that provides wireless access for remote terminals. In addition, depending on the type of network, other well-known terms such as "mobile station", "user station", "remote terminal", "wireless terminal" or "user apparatus" may be used instead of "user equipment" or "UE". For convenience, the terms "user equipment" and "UE" are used herein to refer to a remote wireless device that wirelessly accesses the gNB, no matter whether the UE is a mobile device (such as a mobile phone or a smart phone) or a common fixed device (such as a desktop computer or a vending machine).

The gNB 102 provides wireless broadband access to the network 130 for a first plurality of UEs within a coverage area 120 of the gNB 102. The first plurality of UEs include a UE 111, which may be located in a small business (SB); a UE 112, which may be located in an enterprise (E); a UE 113, which may be located in a Wi-Fi hotspot (HS); a UE 114, which may be located in a first residence (R); a UE 115, which may be located in a second residence (R); and a UE 116, which may be a mobile device (M), such as a cellular phone, a wireless laptop computer, a wireless personal digital assistant (PDA), or the like. The gNB 103 provides wireless broadband access to network 130 for a second plurality of UE within a coverage area 125 of the gNB 103. The second plurality of UEs include the UE 115 and the UE 116. In some embodiments, one or more of the gNBs 101-103 may communicate with each other and with the UEs 111-116 by using 5G, long term evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with obstacles, man-made or natural.

As will be described in more detail below, one or more of the gNB 101, the gNB 102, and the gNB 103 include a 2D antenna array as described herein. In some embodiments, one or more of the gNB 101, the gNB 102, and the gNB 103 support codebook designs and structures for systems with 2D antenna arrays.

Although FIG. 1 illustrates an example of the wireless network 100, various changes may be made to FIG. 1. For example, the wireless network 100 may include any number of gNBs and any number of UEs in any suitable arrangement. Furthermore, the gNB 101 may directly communicate with any number of UEs and provide wireless broadband access to the network 130 for those UEs. Similarly, each of the gNBs 102-103 may directly communicate with the network 130 and provide direct wireless broadband access to the network 130 for the UEs. In addition, the gNBs 101, 102 and/or 103 may provide access to other or additional external networks, such as external telephone networks or other types of data networks.

Figure 2A:
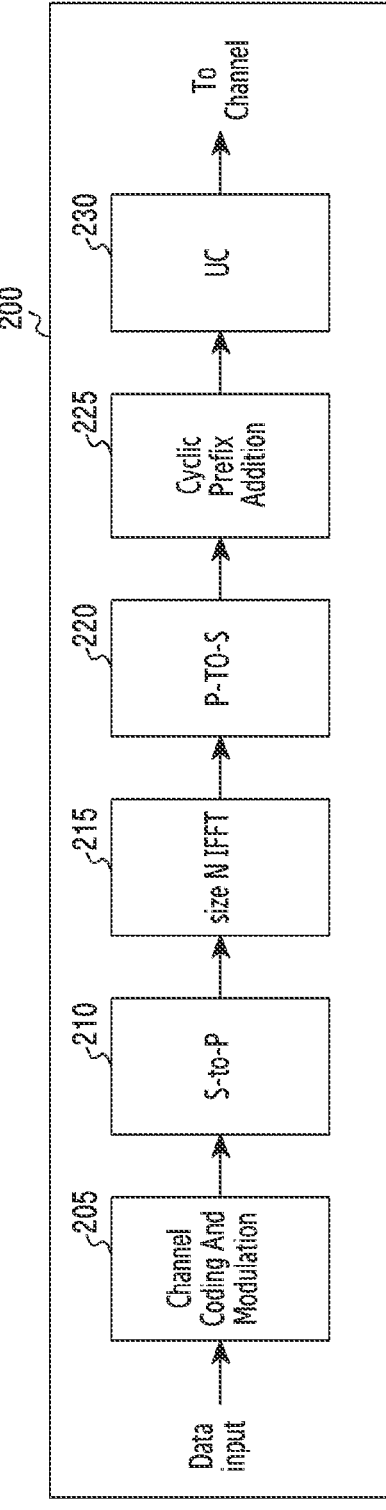
FIG. 2A illustrates wireless transmission and reception paths according to an embodiment.
Figure 2B:
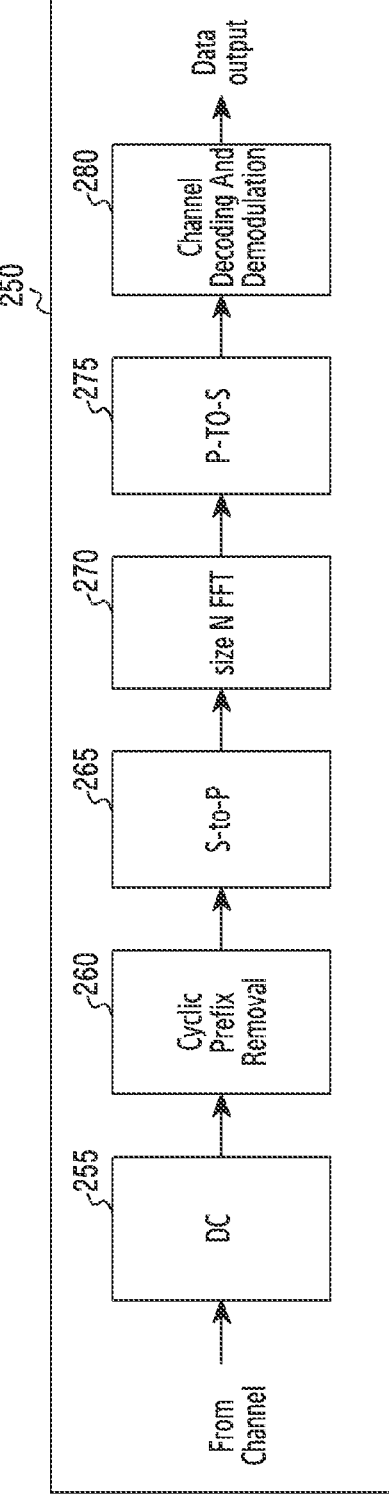
FIG. 2B illustrates wireless transmission and reception paths according to an embodiment.

FIGS. 2A and 2B illustrate wireless transmission and reception paths according to the present disclosure. In the following description, a transmission path 200 may be described as being embodied in a gNB, such as gNB 102, and a reception path 250 may be described as being embodied in a UE, such as UE 116. However, it should be understood that the reception path 250 may be embodied in a gNB and the transmission path 200 may be embodied in a UE. In some embodiments, the reception path 250 is configured to support codebook designs and structures for systems with 2D antenna arrays as described herein.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as LDPC) coding), and modulates the input bits (such as using quadrature phase shift keying (QPSK) or QAM) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The parallel-to-serial block 220 converts (such as multiplexes) parallel time-domain output symbols from the size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. It may also filter the signal at a baseband before converting to the RF frequency.

The RF signal transmitted from the gNB 102 arrives at the UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The size N FFT block 270 performs an FFT algorithm to generate N parallel frequency-domain signals. The parallel-to-serial block 275 converts the parallel frequency-domain signals into a sequence of modulated data symbols. The channel decoding and demodulation block 280 demodulates and decodes the modulated symbols to recover the original input data stream.

Each of the gNBs 101-103 may implement a transmission path 200 similar to that for transmitting to the UEs 111-116 in a downlink, and may implement a reception path 250 similar to that for receiving from the UEs 111-116 in an uplink. Similarly, each of the UEs 111-116 may implement a transmission path 200 for transmitting to the gNBs 101-103 in an uplink, and may implement a reception path 250 for receiving from the gNBs 101-103 in a downlink.

Each of the components in FIGS. 2A and 2B may be embodied in only hardware, or in a combination of hardware and software/firmware. As a specific example, at least some of the components in FIGS. 2A and 2B may be embodied in software, while other components may be embodied in configurable hardware or a combination of software and configurable hardware. For example, the FFT block 270 and IFFT block 215 may be embodied as configurable software algorithms, in which the value of the size N may be modified according to the implementation.

Furthermore, although described as using FFT and IFFT, this is only illustrative and should not be interpreted as limiting the scope of the present disclosure. Other types of transforms may be used, such as Discrete Fourier Transform (DFT) and Inverse Discrete Fourier Transform (IDFT) functions. It should be understood that for DFT and IDFT functions, the value of variable N may be any integer (such as 1, 2, 3, 4), while for FFT and IFFT functions, the value of variable N may be any integer which is a power of 2 (such as 1, 2, 4, 8, 16).

Although FIGS. 2A and 2B illustrate examples of wireless transmission and reception paths, various changes may be made to FIGS. 2A and 2B. For example, various components in FIGS. 2A and 2B may be combined, further subdivided or omitted, and additional components may be added according to specific requirements. Furthermore, FIGS. 2A and 2B are intended to illustrate examples of types of transmission and reception paths that can be used in a wireless network. Any other suitable architecture may be used to support wireless communication in a wireless network.

FIG. 3A illustrates a UE 116 according to an embodiment. The embodiment of the UE 116 shown in FIG. 3A is for illustration only, and the UEs 111-115 of FIG. 1 may have the same or similar configuration. However, a UE has various configurations, and FIG. 3A does not limit the scope of the present disclosure to any specific implementation of the UE.

UE 116 includes an antenna 305, an RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a storage 360. The storage 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to the speaker 330 (such as for voice data) or to the processor/controller 340 for further processing (such as for web browsing data).

The TX processing circuit 315 receives analog or digital voice data from the microphone 320 or other outgoing baseband data (such as network data, email or interactive video game data) from the processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 may include one or more processors or other processing devices and execute an OS 361 stored in the storage 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the storage 360, such as operations for channel quality measurement and reporting for systems with 2D antenna arrays as described herein. The processor/controller 340 can move data into or out of the storage 360 as required by an execution process. In some embodiments, the processor/controller 340 is configured to execute the application 362 based on the OS 361 or in response to signals received from the gNB or the carrier. The processor/controller 340 is also coupled to the I/O interface 345, where the I/O interface 345 provides UE 116 with the capability to connect to other devices such as laptop computers and handheld computers. The I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display (LCD) or another display capable of presenting text and/or at least limited graphics (such as from a website). The storage 360 is coupled to the processor/controller 340. A part of the storage 360 may include a random access memory (RAM), while another part of the storage 360 may include a flash memory or another read-only memory (ROM).

Although FIG. 3A illustrates an example of UE 116, various changes may be made to FIG. 3A. For example, various components in FIG. 3A may be combined, further subdivided or omitted, and additional components may be added according to specific requirements. As a specific example, the processor/controller 340 may be divided into a plurality of processors, such as one or more central processing units (CPUs) and one or more graphics processing units (GPUs). Furthermore, although FIG. 3A illustrates that UE 116 is configured as a mobile phone or a smart phone, the UEs may be configured to operate as other types of mobile or fixed devices.

Figure 3B:
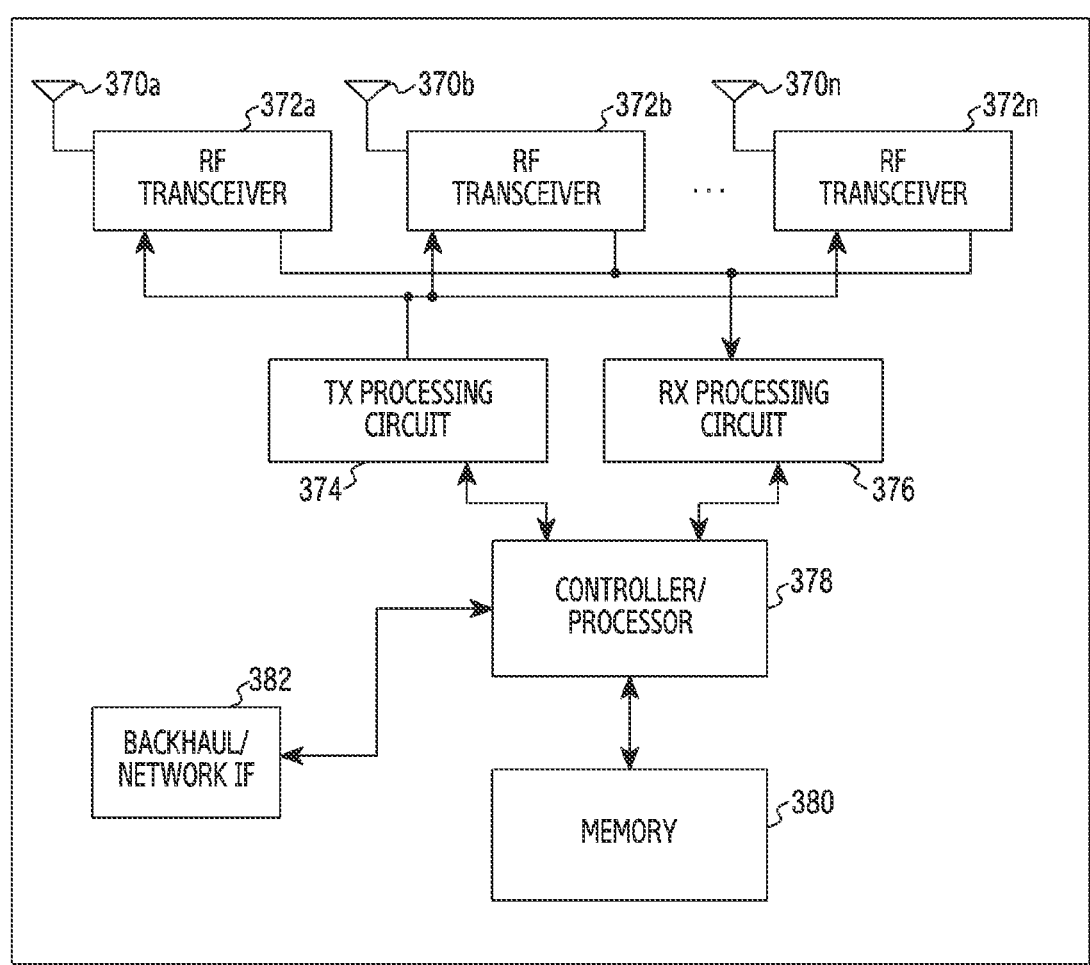
FIG. 3B illustrates a gNB according to an embodiment.

FIG. 3B illustrates a gNB 102 according to an embodiment. The embodiment of the gNB 102 shown in FIG. 3B is for illustration only, and other gNBs of FIG. 1 may have the same or similar configuration. However, a gNB has various configurations, and FIG. 3B does not limit the scope of the present disclosure to any specific implementation of a gNB. It should be noted that gNB 101 and gNB 103 may include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n includes a 2D antenna array. gNB 102 also includes a controller/processor 378, a storage 380, and a backhaul or network interface 382.

The RF transceivers 372a-372n receive an incoming RF signal from the antennas 370a-370n, such as a signal transmitted by a UE or another gNB. The RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. The RX processing circuit 376 transmits the processed baseband signal to the controller/processor 378 for further processing.

The TX processing circuit 374 receives analog or digital data (such as voice data, network data, email or interactive video game data) from the controller/processor 378. The TX processing circuit 374 encodes, multiplexes and/or digitizes outgoing baseband data to generate a processed baseband or IF signal. The RF transceivers 372a-372n receive the outgoing processed baseband or IF signal from the TX processing circuit 374 and up-convert the baseband or IF signal into an RF signal transmitted via the antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the storage 380, such as a basic OS. The controller/processor 378 can also support channel quality measurement and reporting for systems with 2D antenna arrays as described herein. In some embodiments, the controller/processor 378 supports communication between entities such as web Real-Time Communications (RTCs). The controller/processor 378 can move data into or out of the storage 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is embodied as a part of a cellular communication system, such as a cellular communication system supporting 5G or NR access technology or NR, LTE or LTE-A, the backhaul or network interface 382 may allow gNB 102 to communicate with other gNBs through wired or wireless backhaul connections. When gNB 102 is embodied as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The storage 380 is coupled to the controller/processor 378. A part of the storage 380 can include a RAM, while another part of the storage 380 can include a flash memory or other ROMs. In certain embodiments, a plurality of instructions, such as the BIS algorithm, are stored in the storage. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (embodied by using the RF transceivers 372a-372n, the TX processing circuit 374 and/or the RX processing circuit 376) support aggregated communication with frequency division duplexing (FDD) cells and time division duplexing (TDD) cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

In LTE technology, a sidelink communication includes two main mechanisms: direct communication of D2D and vehicle-to-everything communication (including, for example, vehicle-to-vehicle/infrastructure/pedestrian/network communication, collectively referred to as V2X), wherein the V2X is designed on the basis of the D2D technologies, which is better than D2D in terms of data rate, latency, reliability, link capacity, or the like, and is the most representative sidelink communication technology among LTE technologies. In 5G systems, the sidelink communication currently mainly includes vehicle-to-everything (V2X) communication.

The 5G NR system, as an evolution technology of LTE, also includes further evolution of the sidelink communication correspondingly. The NR V2X technology is specified in Release 16, as an evolution version of LTE V2X technology, and properties in various aspects of NR V2X have better performance. In Release 17, the 5G NR system is expected to extend NR V2X application scenarios further to a wider range of other application scenarios, such as commercial sidelink communication and public safety (PS) scenarios. In Release 18, 5G NR SL will further introduce evolution for corresponding other scenarios and applications, such as SL technologies on high frequency (FR2), direction of unlicensed bands, carrier aggregation, co-channel coexistence with LTE or the like, and SL technologies corresponding to specific applications such as positioning.

In LTE and NR sidelink communication systems, the sidelink communication system is designed mainly based on the needs of specific D2D and vehicle business scenarios, and used frequency bands mainly focus on specific licensed bands, such as the intelligent transportation system (ITS) frequency bands dedicated for vehicle transportation, and so on. With the development of 5G technologies, the business model of sidelink communication is growing, so it is necessary to enhance the sidelink communication technology to apply to a wider range of application scenarios, such as XR, HoT, reduced capability (RedCap), or the like. For the traffic needs of some future application scenarios, the transmission rate, latency, and reliability that can be achieved by the current sidelink communication technology need to be further enhanced. One feasible approach is to apply sidelink communication to more frequency bands, such as unlicensed bands, to increase the transmission rate and reliability can be supported by the sidelink system by way of increasing the bandwidth, and reducing the traffic transmission latency through high-frequency communication. However, the current sidelink communication system has not explored the possibility of sidelink communication on unlicensed bands, and it also has not introduced any enhancement mechanisms for unlicensed bands.

The present disclosure provides a method for feedback based on interference that may occur at any time on a licensed band. The method combines the advantages of the sidelink feedback channel mapping on the licensed band to avoid interference within the system and the listen before talk (LBT) technology on an unlicensed frequency band for avoiding interference from other communication systems, so that the UE can select resources with better performance on the unlicensed band and reduce interference to other communication systems as much as possible.

Optionally, in an embodiment, information configured by a base station, indicated by a signalling, configured by a higher layer, or preconfigured may include a set of configuration information. It can also include multiple sets of configuration information, from which a UE selects a set of configuration information to use according to a predefined condition. A case can also be included where a set of configuration information contains multiple subsets from which the UE selects a subset to use according to a predefined condition.

In an embodiment, below a threshold may also be replaced with below or equal to the threshold, above (exceeding) a threshold may also be replaced with above or equal to the threshold, less than or equal to may also be replaced with less than, greater than or equal to may also be replaced with greater than, or vice versa.

Although some of the technical solutions provided in the embodiments of the present disclosure are specifically described based on a V2X system, application scenarios thereof should not be limited to the V2X system in the sidelink communication, and can also be applied to other sidelink transmission systems. For example, the V2X subchannel-based design in the following embodiment may also be used for D2D subchannel or other sidelink transmission subchannels. The V2X resource pool in the following embodiments may also be replaced with a D2D resource pool in other sidelink transmission systems, such as a D2D system.

In an embodiment, when the sidelink communication system is a V2X system, a terminal or a UE may be multiple types of terminals or UEs such as a vehicle, an infrastructure, a pedestrian, and the like.

The base station in the present disclosure may also be replaced by other nodes, such as a sidelink node. A specific example is an infrastructure UE in the sidelink system. Any mechanism applicable to a base station may also be similarly used in the scenario where the base station is replaced with other sidelink nodes, which will not be described repeatedly.

A slot in the present disclosure may also be replaced with a time unit, a candidate slot may also be replaced with a candidate time unit, and a candidate single slot resource may also be replaced with a candidate single time unit resource. The time unit includes a specific length of time, such as several consecutive symbols.

A slot in the present disclosure may be either a subframe or a slot in the physical sense, or a subframe or a slot in the logical sense. Specifically, a subframe or a slot in the logical sense is a subframe or a slot corresponding to a resource pool of sidelink communication. For example, in a V2X system, the resource pool is defined by a repeating bit graph that maps onto a specific set of slots, which can be all slots or all other slots except for some specific slots (e.g., slots for transmitting a master information block (MIB)/a system information block (SIB)). The slot indicated as "1" in the bit graph may be used for V2X transmission and belongs to slots corresponding to the V2X resource pool. The slot indicated as "0" cannot be used for V2X transmission and does not belong to the slots corresponding to the V2X resource pool.

The following illustrates the difference between a subframe or a slot in the physical sense and a subframe or a slot in logical sense through a typical application scenario. When calculating a time-domain gap between two specific channels/messages (e.g., a physical sidelink shared channel (PSSCH) that carries sidelink data) and a physical sidelink feedback channel (PSFCH) that carries corresponding feedback information), assuming that the gap is N slots, if the subframe or the slot in the physical sense is calculated, the N slots correspond to an absolute time length of N*x milliseconds in the time domain, wherein x is the time length of the physical slot (subframe) under a numerology in such scenario, in milliseconds. Otherwise, if the subframe or the slot in the logical sense is calculated, taking the sidelink resource pool defined by the bitgraph as an example, the gap of the N slots corresponds to the N slots in the bitgraph indicated as "1", and the absolute length of the gap varies with the specific configuration situation of the sidelink communication resource pool, without a fixed value.

Furthermore, a slot in this disclosure may be a complete slot, may also be several symbols in a slot corresponding to the sidelink communication. For example, when the sidelink communication is configured to be performed on X1th~X2th symbols of each slot, the slot in the following embodiment in this scenario is the X1th~X2th symbols in the slot. Alternatively, when the sidelink communication is configured for mini-slot transmission, the slot in the following embodiment is a mini-slot defined or configured in the sidelink system, rather than a slot in an NR system. Alternatively, when the sidelink communication is configured for symbol-level transmission, the slot in the following embodiment may be replaced with a symbol, or may be replaced with N symbols as a time domain granularity of the symbol-level transmission.

In order to make the purpose, technical solution and advantages of the present disclosure clearer, implementations of the present disclosure will be further described in detail below with reference to the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

In the LTE sidelink communication system and the NR V2X system of Release 16, frequency domain resources for sidelink communication are generally located in a licensed band, and it is generally assumed that there is basically no interference from other external communication systems (such as Wi-Fi, Bluetooth™, or the like) on this frequency band. However, for a sidelink communication system operating on an unlicensed band, it is necessary to consider interferences from other communication systems to the sidelink communication on an unlicensed carrier, and it is also necessary to limit interferences of the sidelink communication to other communication systems according to regulations.

In an NR unlicensed (NR-U) system of Releases 15 and 16, LBT is used as one of the typical technologies on an unlicensed band. A special frame structure is defined for the NR communication system on the unlicensed band in this technology, which contains several gaps for LBT. A UE and a base station need to first perform LBT before performing an uplink or downlink transmission, and can only transmit various wireless signals/channels normally after the LBT passes. The present disclosure provides a method for using the LBT technology in a sidelink communication system.

In a communication system on an unlicensed band, a channel occupancy (CO) refers to a transmission on a corresponding channel after a base station/UE performs a channel access process, and a channel occupancy time (COT) refers to the total time of transmission on the corresponding channel by the base station/UE and the base station/UE that shares the channel occupancy after performing the channel access process. Both a base station and/or a sidelink UE can initiate a COT and share that COT with another base station and/or sidelink UE. After initiating a COT or acquiring a COT shared by the base station/another node, the UE needs to determine a structure and a location of a sidelink resource within the COT. The present disclosure illustrates a specific method for the UE to determine the structure and location of the sidelink resource within the COT.

In NR-U band technologies, the structure of uplink/downlink resources in COT can be represented by uplink/downlink bursts, wherein an uplink/downlink burst is a set of transmissions from the base station or the UE, and there is no gap exceeding a specific length between the transmissions. Similar to the definition of uplink/downlink bursts in the prior art, the structure of sidelink resources within COT can also be represented by a sidelink burst, wherein the sidelink burst is a set of transmissions from the UE, and there is no gap exceeding a specific length (e.g., 16 μs) between them. Optionally, only transmissions from the same UE are included within a burst. Alternatively, transmissions from the same UE or different UEs may be included within a burst. Optionally, only one or more specific kinds of signals/channels are included within a burst. For example, only physical sidelink control channels (PSCCHs) and/or PSSCHs are included within a burst, only PSFCHs are included within another burst, or PSCCHs, PSSCHs, and PSFCHs may be included within a burst. Optionally, similar to the discovery burst in the prior art, a sidelink synchronization signal, a sidelink synchronization channel, and a sidelink reference signal (which can be a specific type of reference signal/a reference signal that meets a specific condition) correspond to a sidelink discovery burst instead of a general sidelink burst.

In the sidelink communication technology, from the perspective of resource allocation, a 5G sidelink communication system includes two modes: a resource allocation mode based on scheduling of the base station and a resource allocation mode by independent selection of the UE. In a 5G V2X system, the resource allocation mode based on scheduling of the base station and the resource allocation mode by independent selection of the UE are referred to as Mode 1 and Mode 2, respectively. For the resource allocation Mode 2, a method for the sidelink UE to independently select a resource is: the UE keeps listening and caching for the sidelink resource pool, and determines a channel sensing time window and a resource selection time window according to an expected transmitting time range for transmitting a sidelink transmission before transmitting the sidelink transmission, performs channel sensing within the channel sensing time window, and excludes the sidelink resources that have been reserved by other sidelink UEs in the resource selection time window according to the result of the channel sensing, and randomly selects resources for sidelink transmission among the sidelink resources that are not excluded in the resource selection time window. When the mechanism operates on an unlicensed band, as affected by the features of the unlicensed band itself, the mechanism also needs to be modified accordingly to adapt to the uncertainty caused by the channel preemption mechanism based on COT sharing and LBT on the unlicensed band, and to make sure the operation of sidelink communication on the unlicensed band does not violate restrictions of regulations.

In a sidelink communication system on a licensed band, for a transmission with the HARQ feedback feature enabled, the mapping relation between a PSSCH for transmitting data and a PSFCH for transmitting a HARQ-ACK feedback is fixed, and a UE determines the position of the PSFCH based on a predetermined rule and the position of the PSSCH. Specifically, the UE acquires the minimum gap between the PSSCH and the PSFCH through a radio resource control (RRC) configuration, and the time domain position of the PSFCH is the earliest slot containing PSFCH resource after the logical slot of the minimum gap from the PSSCH time domain position. The UE acquires the physical resource block (PRB) position of the PSFCH through the RRC configuration, and determines the PRB index of the PSFCH by way of ascending mapping in a predetermined order according to the subchannel index of the PSSCH, the identity of the UE and the time domain position of the PSSCH in a PSFCH cycle. The advantage of this method when running on a licensed band is that a UE does not need to indicate the position of PSFCH resources additionally, and all UEs use the same mapping rule, ensuring that as long as the PSSCHs used for transmission do not collide for different UEs, the corresponding PSFCHs will not collide, thereby reducing the chance of collisions and additional overheads of the UE for PSFCH collision avoidance.

When the foregoing method is used on an unlicensed band, additional problems may be caused due to the effects of UE processing latency and PSFCH transmission latency introduced by longer PSFCH cycles. For example, for a PSSCH near the end of COT, the PSFCH resource position mapped therefrom according to the current predetermined rule will exceed the end position of COT. Accordingly, in order to transmit a PSFCH at this position, the RX UE may need to execute an LBT with a longer listening time, and the PSFCH transmission has to face double risks of an LBT failure and exceeding the original PSFCH time domain position due to the excessive length of the LBT time.

Therefore, in order to reduce transmission drops caused by LBT, and/or to reserve sufficient time for the UE to perform the LBT, this disclosure provides a new method for determining the position of a resource of a feedback signalling for sidelink communication on the unlicensed band.

In addition, in a sidelink communication system on a licensed band, a PSFCH carries only 1-bit information, and accordingly, one feedback signalling sent by the UE can only indicate the HARQ-ACK information corresponding to the one PSSCH. Although the concept of codebook is introduced in a sidelink communication system to support the indication of HARQ-ACK information for multiple PSSCHs in one feedback signalling, this method is only used in a process when the UE reports the HARQ-ACK to a gNB on a PUCCH in Mode 1, and not on the sidelink channel/signalling.

In order to reduce negative impacts of transmission drops caused by LBT failures on transmitting the feedback signalling, this disclosure also provides a method enabling a UE to transmit HARQ-ACK information corresponding to multiple PSSCHs in a single feedback signalling. After using this method, if the UE fails to transmit HARQ-ACK information corresponding to one or more PSSCHs due to LBT failures, it can also transmit the previously dropped HARQ-ACK information altogether when a subsequent LBT passes and a feedback signalling is sent.

Embodiment 1

In the present embodiment, a method for determining a resource of a feedback signalling by a dynamic indication is provided. A signalling is sent by a first UE to a second UE for indicating information of the resource, wherein the resource is used by the second UE to transmit a feedback signalling to the first UE. The first UE receives the feedback signalling sent by the second UE on the resource. Accordingly, the second UE receives from the first UE a signalling for indicating information of the resource, wherein the resource is used by the second UE to transmit a feedback signalling to the first UE. The second UE transmits the feedback signalling to the first UE on the resource.

Specifically, the feedback signalling corresponds to data sent by the first UE to the second UE.

Optionally, the signalling for indicating the information of the resource includes sidelink control information (SCI), and further includes a first-stage SCI and/or a second-stage SCI, and formats thereof include an existing SCI format and/or a new SCI format.

Optionally, the resource includes at least one of a PSCCH resource, a PSSCH resource, and a PSFCH resource.

In an embodiment, the first UE transmits a PSSCH (referred to as PSSCH-1 for ease of description) to the second UE, and indicates information of the resource in SCI associated with the PSSCH, wherein the resource is used by the second UE to transmit a feedback signalling to the first UE. The feedback signalling may be a feedback signalling for PSSCH-1.

Optionally, when at least one of the following conditions is met, the first UE transmits to the second UE a signalling for indicating information of the resource used by the second UE to transmit a feedback signalling to the first UE, and/or through the signalling sent by the first UE, the second UE acquires the information of the resource used by the second UE to transmit the feedback signalling to the first UE:

a feature of dynamically indicating a feedback resource is configured by a higher layer and/or enabled for the first UE and/or second UE;

the second UE indicates in a sidelink signal/channel (e.g., SCI, a media access control control element (MAC CE)) that the second UE is configured and/or enabled for the feature of dynamically indicating the feedback resource;

the first UE and/or the second UE operates on an unlicensed band;

the first UE and/or the second UE is not configured to be able to use an LBT-free short control signalling (SCS), and/or the first UE and/or the second UE is configured not to be able to use the SCS;

the feedback signalling and/or data corresponding to the feedback signalling is transmitted on an unlicensed band;

a position of a PSSCH corresponding to the feedback signalling is later than a specific time; and furthermore, a gap from the position of the PSSCH to the end of COT does not exceed a specific length;

a position of a PSFCH to which a PSSCH corresponding to the feedback signalling is mapped through a predetermined rule exceeds the end position of the COT;

a position of a PSFCH to which a PSSCH corresponding to the feedback signalling is mapped through a predetermined rule exceeds the end position of COT, and a gap between the position of the PSFCH and the end position of COT conforms to a predetermined threshold range; and the PSSCH corresponding to the feedback signalling cannot acquire the corresponding PSFCH resource or the corresponding PSFCH resource within the COT through mapping based on a method on a licensed band. As an example, the position of the PSFCH resource obtained by mapping of the PSSCH is outside the COT. As another example, not a complete PSFCH cycle is contained within the end of COT, that is, the PSSCH resource on the last several slots at the end of the COT does not have the corresponding PSFCH resource. As yet another example, the PSFCH resource is not configured in the resource pool.

Otherwise, the first UE uses the method on the licensed band to determine the resources used by the second UE to transmit the feedback signalling to the first UE; and/or the second UE uses a method on the licensed band to determine the resource used by the second UE to transmit the feedback signalling to the first UE.

For the condition where the position of the PSSCH corresponding to the feedback signalling is later than a specific time, a specific example is when the COT for transmitting the PSSCH corresponding to the feedback signalling will end at the slot n, if the PSSCH is transmitted no later than the slot n-k, the position of the PSSCH corresponding to the feedback signalling is not considered to be later than the specific time. If the PSSCH is transmitted after the slot n-k, the position of the PSSCH corresponding to the feedback signalling is considered to be later than the specific time. k is predefined and/or preset and/or configured by a higher layer. The value of k can be determined according to a length of a PSFCH cycle, e.g., different k values are configured/preset for different PSFCH cycle lengths. k may be the number of logical slots. For example, the above condition further includes, whether the position of the PSSCH corresponding to the feedback signalling is later than the specific time is based on whether the PSSCH is transmitted no later than k logical subframes before the slot n; and/or, k can be the number of physical slots, i.e. the k slots may or may not belong to the resource pool corresponding to the PSSCH.

For the condition where the position of the PSFCH to which the PSSCH corresponding to the feedback signalling is mapped through a predetermined rule exceeds the end position of COT, a specific example is when the PSSCH corresponding to the feedback signalling is at the slot n, according to the PSSCH-PSFCH mapping rule, the time domain position of the corresponding PSFCH is in the earliest slot (referred to as n1) containing the PSFCH resource after the slot n+k. The end position of COT is referred to as n2, when the slot n1 is after the end position of COT, that is, n1>n2, the first UE transmits to the second UE a signalling for indicating information of the resource used by the second UE to transmit the feedback signalling to the first UE. Otherwise, the existing PSSCH-PSFCH mapping rule is used to determine the PSFCH resource for transmitting the feedback signalling.

Figure 4:
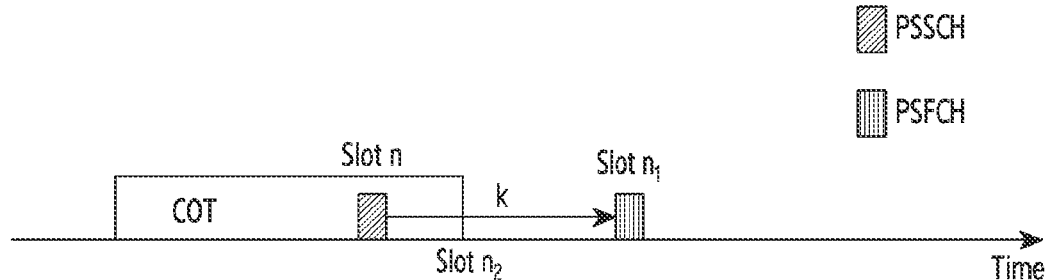
FIG. 4 illustrates a schematic diagram of a condition where the position of a PSFCH to which a PSSCH corresponding to a feedback signalling is mapped through a predetermined rule exceeds the end position of the COT according to an embodiment.

For the condition where the position of the PSFCH to which the PSSCH corresponding to the feedback signalling is mapped through a predetermined rule exceeds the end position of COT, and a gap between the position of the PSFCH and the end position of COT conforms to a predetermined threshold range, a specific example is when the PSSCH corresponding to the feedback signalling is at the slot n, according to the PSSCH-PSFCH mapping rule, the time domain position of the corresponding PSFCH is in the earliest slot (referred to as n1) containing the PSFCH resource after the slot n+k, as shown in FIG. 4. The end position of COT is referred to as n2, when the slot n1 is after the end position of COT, that is, n1>n2, and the gap conforms to the predetermined threshold range, that is, n1-n2<p, the first UE transmits to the second UE a signalling for indicating information of the resource used by the second UE to transmit a feedback signalling to the first UE. Otherwise, the existing PSSCH-PSFCH mapping rule is used to determine the PSFCH resource for transmitting the feedback signalling, and it is assumed that the second UE will perform LBT before the slot n1 to preempt the channel for transmitting the feedback signalling.

Optionally, p corresponds to the number of logical slots, that is, when the slot n1 is after the end position of COT and a gap between the slot n1 and the end position of COT is less than p logical subframes, the first UE transmits to the second UE a signalling for indicating information of the resource used by the second UE to transmit a feedback signalling to the first UE. Otherwise, the existing PSSCH-PSFCH mapping rule is used to determine the PSFCH resource for transmitting the feedback signalling. Optionally, p corresponds to the number of physical slots, that is, when the number of physical slots between n1 and n2 (which may or may not belong to the resource pool corresponding to the PSSCH) is less than p, the first UE transmits to the second UE a signalling for indicating information of the resource used by the second UE to transmit a feedback signalling to the first UE. Otherwise, the existing PSSCH-PSFCH mapping rule is used to determine the PSFCH resource for transmitting the feedback signalling. The advantage of this method lies in that when the time gap between the PSSCH and the PSFCH is long enough, the first/second UE can attempt to initiate a new COT through LBT after the end of the COT, and if the LBT is successful, transmit the feedback signalling in the new COT according to the resource position determined by the existing mapping rule. Otherwise, when the length of the time gap between the PSSCH and the PSFCH is not long enough, that is, when the gap is not long enough to complete the LBT to initiate a new COT, the resource position determined by the existing mapping rule is usually unavailable, and at that time, a new resource position that can be used can be indicated for the second UE by the method for dynamic indication in the present disclosure.

Optionally, information indicated in the feedback signalling includes the HARQ-ACK information corresponding to the PSSCH-1.

Optionally, the information indicated in the feedback signalling includes HARQ-ACK information corresponding to at least one other PSSCH sent by the first UE to the second UE. Furthermore, the at least one other PSSCH includes at least one PSSCH transmitted before the PSSCH-1 and/or at least one PSSCH to be transmitted after the PSSCH-1.

Optionally, the information indicated in the feedback signalling includes at least one of the following:

HARQ-ACK information corresponding to each or at least one PSSCH indicated in SCI and/or PSCCHs associated with the PSSCH-1;

HARQ-ACK information of a PSSCH group to which the PSSCH-1 belongs;

HARQ-ACK information for each or at least one PSSCH group indicated in the SCI and/or PSCCHs associated with the PSSCH-1;

HARQ-ACK information corresponding to each or at least one sidelink HARQ process of the second UE; and furthermore, HARQ-ACK information corresponding to each or at least one sidelink HARQ process of the second UE for receiving data from the first UE;

HARQ-ACK information corresponding to each or at least one PSSCH sent by the first UE to the second UE, wherein the each or at least one PSSCH includes PSSCHs before the time domain position of the resource used by the PSSCH-1 and/or before the time domain position of the resource for transmitting the feedback signalling, and furthermore, the above condition of before the time domain position is also limited by a processing latency, for example, the information indicated in the feedback signalling includes HARQ-ACK information corresponding to each PSSCH sent by the first UE to the second UE before the time domain position of the resource for transmitting the feedback signalling and the time gap exceeds Tproc,x. One specific example is, when the resource for transmitting the feedback signalling is at the slot n, the information indicated in the feedback signalling includes the HARQ-ACK information corresponding to each PSSCH sent by the first UE to the second UE before the slot n-Tproc,x. Tproc,x corresponds to a UE processing latency, e.g., can be sl-MinTimeGapPSFCH configured by a higher layer.

Optionally, the first UE indicates information of the resource in the SCI, including indicating the resource is used to transmit a feedback signalling corresponding to which of the above PSSCHs; and/or, the resource is used to transmit a feedback signalling corresponding to which of the above PSSCHs is predetermined and/or (pre)configured for the first UE and/or the second UE. The indication may be implicit or explicit, an explicit indication includes that the first UE indicates by at least 1 bit in the SCI whether the HARQ-ACK feedback of a certain PSSCH of the above PSSCHs is included in the feedback signalling (e.g., in the SCI, indicates by 1 bit that the feedback signalling includes HARQ-ACK information corresponding to each PSSCH or HARQ-ACK information corresponding to the PSSCH-1, in the SCI, indicates by 1 bit that the feedback signalling includes the HARQ-ACK information corresponding to each sidelink HARQ process of the second UE or the HARQ-ACK information corresponding to the PSSCH-1, or the like, and furthermore, whether the HARQ-ACK information corresponding to different types of PSSCHs is included in the feedback signalling can be indicated by different bits).

Optionally, the first UE indicates information of the resource in the SCI, and distinguishes at least one of the resource used as a transmission resource reserved for the first UE, the resource indicated in the inter-UE collaboration information, and the resource used by the second UE to transmit a feedback signalling to the first UE, through at least one of the following:

the SCI format used; for example, indicates through the SCI format 2-A/2-B/2-C the transmission resource is reserved by the first UE in the SCI and inter-UE collaboration information in the prior art, and indicates through a new SCI format the resource used by the second UE to transmit feedback signalling to the first UE;

an explicit field that indicates the resource used by the second UE to transmit feedback signalling to the first UE; and a type of the resource indicated; for example, the PSSCH resource indicated in the SCI is used as transmission resources reserved by the first UE in the SCI and inter-UE collaboration information in the prior art, and the PSFCH resource indicated in the SCI is used by the second UE to transmit a feedback signalling to the first UE.

Optionally, when HARQ-ACK information corresponding to at least one PSSCH is indicated in the feedback signalling, the manner for indicating the information includes at least one of the following:

HARQ-ACK information corresponding to the at least one PSSCH is indicated by a 1-bit information, which includes indicating the HARQ-ACK information corresponding to the at least one PSSCH by means of mapping HARQ-ACK information to a cyclic shift of a sequence of the PSFCH transmission. Furthermore, when the at least one PSSCH includes more than one PSSCH, the manner for indicating the information includes at least one of the following: a) indicating by a 1-bit information bundled HARQ-ACK information corresponding to the at least one PSSCH, such as indicating information generated after performing a logical AND operation on the HARQ-ACK information of each PSSCH of more than one PSSCH. Optionally, the condition that the at least one PSSCH includes more than one PSSCH may also be: at least one PSSCH includes more than one PSSCH corresponding to more than one transport block (TB); b) the HARQ-ACK information corresponding to the last PSSCH in the at least one PSSCH is indicated by a 1-bit information. Optionally, the condition that the at least one PSSCH includes more than one PSSCH may also be that: at least one PSSCH includes more than one PSSCH corresponding to one TB.

The HARQ-ACK information corresponding to the at least one PSSCH is indicated by a codebook.

Optionally, when indicating the HARQ-ACK information corresponding to the at least one PSSCH by the codebook, the codebook is generated in at least one of the following ways:

similar to a type-1 codebook, each PSSCH resource in a certain range are sorted according to a preset mapping rule and a semi-static codebook is generated accordingly;

similar to a type-2 codebook, a dynamic codebook is generated for the PSSCH indicated in one or more SCIs according to sidelink assignment indicators (SAI) thereof;

similar to a type-3 codebook, a one-shot feedback codebook is generated by a HARQ process number for all sidelink processes and/or all HARQ processes used to receive PSSCH of the first UE. Optionally, a codebook is generated by a HARQ process number used by the second UE for reception, and/or a codebook is generated by a HARQ process number used by the first UE for transmission. The reason for this method is that the HARQ process number used by the first UE to transmit a PSSCH and the HARQ process number used by the second UE to receive the same PSSCH can be different, and the second UE implements determination of the mapping relation between the two, so it is necessary to distinguish by which process number to generate the codebook; and based on a PSSCH group indication, a codebook corresponding to a group to which PSSCH-1 belongs is generated. Optionally, this method is used when parameters related to the HARQ-ACK information of the PSSCH group to which PSSCH-1 belongs are indicated in the SCI.

When the codebook includes HARQ-ACK information corresponding to each or at least one PSSCH indicated in the SCI and/or a PSCCH, the corresponding HARQ-ACK information is indicated sequentially in the chronological ascending order of the each or at least one PSSCH.

Optionally, when the resource for transmitting the feedback signalling indicated by the first UE for the second UE is a PSFCH resource, the HARQ-ACK information is indicated through a 1-bit information in the feedback signalling. Optionally, when the resource for transmitting the feedback signalling indicated by the first UE for the second UE is a PSCCH and/or PSSCH resource, and/or the resource for transmitting the feedback signalling indicated by the first UE for the second UE is a PSFCH resource which has more than two available states (e.g., at least one of a time domain size, a frequency domain size, and a code domain size of the PSFCH resource is greater than 1, wherein the code domain size includes the number of cyclic shift pairs), the HARQ-ACK information is indicated in the feedback signalling by a HARQ-ACK codebook. Optionally, the first UE and/or the second UE in the SCI explicitly (e.g., by 1 bit) indicates that HARQ-ACK information is indicated in the feedback signalling through a 1-bit information or through a codebook.

Optionally, in the feedback signalling, HARQ-ACK information is indicated in at least one of the following ways:

A sequence. Furthermore, a PSFCH resource includes a cyclic shift pair of the sequence on the code domain, and the 1-bit information is indicated by the cyclic shift pair; and/or, a PSFCH resource includes $N$ cyclic shift pairs of the sequence on the code domain, and $N$ bit information is indicated through the $N$ cyclic shift pairs. Optionally, when the PSFCH resource includes $N$ cyclic shift pairs of the sequence on the code domain, the PSSCH-PSFCH mapping rule includes using at least one of the following on the basis of the existing PSSCH-PSFCH resource mapping rule: mapping each PSSCH resource to values of $N\,m_0$ (a PSFCH code domain resource parameter to determine the value of a cyclic shift, wherein its usage in a licensed band is illustrated in protocol TS38.213, section 16.3), mapping each PSSCH resource to values of $N\,m_{CS}$ (a PSFCH code domain resource parameter to determine the value of a cyclic shift, wherein its usage in a licensed band is illustrated in protocol TS38.213, section 16.3), mapping each PSSCH resource to values of N MID (a PSFCH code domain resource parameter with a logical meaning based on a UE identity, wherein its usage in a licensed band is illustrated in protocol TS38.213, section 16.3), mapping each PSSCH resource to N PSFCH PRBs, and mapping each PSSCH resource to the PSFCH resource corresponding to N sub-channels; and SCI. Furthermore, a sidelink codebook is indicated in a particular SCI format, the specific content of the codebook is shown in the method described above. Specifically, it is indicated in the first stage SCI that the second stage SCI carries a sidelink codebook (which can be implicitly indicated by indicating a specific second stage SCI), and the sidelink codebook is indicated in the second stage SCI.

Optionally, the first UE indicates to the second UE information of the resource used by the second UE for transmitting the feedback signalling to the first UE, wherein the resource used by the second UE for transmitting the feedback signalling to the first UE may be at least one of a PSCCH resource, a PSSCH resource, and a PSFCH resource. The resource may be at least one slot and/or at least one OFDM symbol in the time domain and may be at least one PRB and/or subchannel in the frequency domain.

Optionally, the first UE indicates to the second UE information of a resource used by the second UE for transmitting a feedback signalling to the first UE, the information may include at least one of the following:

a slot in which the resource is located. Optionally, it is indicated by a slot index, and/or by a time domain resource allocation (TDRA) domain, and/or by a time gap between the indication signalling and the feedback signalling, and/or by a time gap between the PSSCH/ PSCCH corresponding to the feedback signalling and the feedback signalling. Values of the indication may include a specific value (e.g., a positive integer) or a non-numeric value so that the UE can perform LBT at this larger time gap to initiate a new COT (e.g., COT2 in FIG. 5) and transmit the feedback signalling in the new COT. Optionally, the meaning for indicating the non-numeric value includes the first UE and/or the second UE additionally indicates in the new COT the position of the resource of the feedback signalling, for example, dynamically indicates by the other methods described above;

an index of a subchannel on which the resource is located; an index of a PRB of the resource, including the PRB index and/or an index of the PRB in the resource pool. Optionally, when the resource is a PSFCH, the PRB index of the resource is an index of the PRB in the PSFCH resource configured in the resource pool;

a time domain and/or frequency domain position of at least one PSSCH resource. Specifically, it is indicated by a TDRA domain and/or a frequency domain resource allocation (FDRA) domain, including indicated by reusing the manner for indicating TDRA/ FDRA domain in an SCI format 1-A/2-A/2-B/2-C, or by indicating a slot number and/or a subchannel number and/or a resource block (RB) index through a specific domain, or implicitly indicated by a preset/ (pre)configured mapping rule;

a time domain and/or frequency domain position of at least one PSCCH resource. Specifically, it is indicated by a TDRA domain and/or an FDRA domain, including indicated by reusing the manner for indicating TDRA/ FDRA domain in an SCI format 1-A/2-A/2-B/2-C, or by indicating a slot number and/or a subchannel number and/or an RB index through a specific domain, or implicitly indicated by a preset/(pre)configured mapping rule; or at least one PSSCH resource is indicated by other methods described above, wherein the at least one PSCCH resource is the PSCCH resource associated with the at least one PSSCH resource, i.e., the time domain and/or frequency domain position of the PSCCH resource is determined by the indicated PSSCH resource; and a time domain and/or frequency domain position of at least one PSFCH resource. Specifically, it is indicated by a TDRA domain and/or FDRA domain, including indicated by reusing the manner for indicating the TDRA/FDRA domain in the SCI format 1-A/2-A/2-B/ 2-C, or by indicating a slot number and/or subchannel number and/or RB index through a specific domain, or implicitly indicated by a preset/(pre)configured mapping rule. In one specific example, the first UE indicates the time domain and/or frequency domain position of the at least one PSFCH resource via SCI, wherein the time domain position of the PSFCH resource is implicitly indicated by a preset rule, such as the earliest slot containing the PSFCH resource after the sl-MinTimeGapPSFCH logical or physical slots after the SCI. The frequency domain position of a PSFCH resource is explicitly indicated, and its PRB index is indicated by a domain of length N bits in the SCI, $$N = \log 2 \left( M_{PRB,set}^{PSFCH} \right)$$

rounded up, and $$M_{PRB,set}^{PSFCH}$$

is the number of PRBs in a set of PRBs within the resource pool used to transmit the PSFCH (furthermore, a set of PRBs for dynamically indicated PSFCH transmissions, or a set of PRBs for any PSFCH transmission). In another specific example, the first UE indicates the time domain and/or frequency domain position of the at least one PSFCH resource via SCI, wherein the time domain position of the PSFCH is explicitly indicated by a domain of a length of M-bit in the SCI, a subchannel in which the frequency domain position of the PSFCH is located is obtained by mapping according to a subchannel where SCI is located, and the position of the PRB where the frequency domain position of PSFCH is located in the subchannel is explicitly indicated by a domain of a length of N1 in the SCI.

Optionally, the first UE indicates to the second UE information of the resource used by the second UE for transmitting the feedback signalling to the first UE, including indicates in SCI, which includes at least one of the following:

SCI associated with at least one PSSCH corresponding to the feedback signalling. For example, the feedback signalling carries HARQ-ACK information of the PSSCH-1, and the SCI is SCI associated with the PSSCH-1;

SCI associated with other PSSCHs not corresponding to the feedback signalling; and stand-alone SCI. For example, the first UE transmits the PSSCH-1 and its associated SCI (the SCI is used to indicate control information of the PSSCH-1, and is referred to as SCI-1), and transmits SCI without an associated PSSCH (referred to as SCI-2) to indicate information of the resource used by the second UE for transmitting the feedback signalling to the first UE, wherein the feedback signalling carries HARQ-ACK information of the PSSCH-1.

Optionally, the first UE indicates to the second UE information of the resource used by the second UE for transmitting the feedback signalling to the first UE, the resource may include at least one of the following:

a resource within the current COT (i.e., the COT that sent the information); a resource outside the current COT; a resource within another COT; and a resource within N starting slots of the COT (wherein N is a preset/(pre) configured parameter, e.g., N is sl-MinTimeGapPSFCH configured by a higher layer). The advantage of the resource within N starting slots of the COT is that when a PSFCH resource is indicated across COTs, if a PSFCH resource after N starting slots of the COT is indicated, the indicated resource may coincide with a PSFCH corresponding to other PSSCH transmissions within N starting slots of the COT (if the PSSCH transmission determines the PSFCH resource using the mapping rule on a licensed band), that is, an additional conflict is introduced. When indicating the resource within the N starting slots of the COT, due to the limitation of processing latency, the PSFCH resources mapped by other PSSCH transmissions in the COT will not be located in the first N slots, which avoids additional conflicts.

In one specific example, the UE transmits a PSSCH within a COT-1, and transmits within the COT-1, SCI for indicating to the second UE information of a resource used by the second UE for transmitting a feedback signalling to the first UE, wherein the SCI indicates a PSFCH resource located within a COT-2, and furthermore, indicates a PSFCH resource contained in the first sl-MinTimeGapPSFCH slots located within the COT-2.

When the first UE indicates to the second UE the information of the resource used by the second UE for transmitting the feedback signalling resource to the first UE, as shown in the above method, the slot in which the resource is located may be indicated, including indicated by a time gap between the indication signalling and the feedback signalling and/or a time gap between the PSSCH/PSCCH corresponding to the feedback signalling and the feedback signalling. Optionally, the time gap includes logical slots (or other time units, similar for following contents), i.e., does not include slots that are not configured to the resource pool corresponding to the feedback signalling; or includes physical slots. Optionally, the time gap includes slots within and outside COT (or other time units, similar for following contents); or the time gap includes only slots within the COT. Furthermore, the time gap includes only the slots within a COT initiated by the first UE and/or within a COT shared to the first UE. Furthermore, the time gap includes only the slots within COT initiated by the first UE (optionally, the COT is initiated by the first UE and shared at least to the second UE) and/or a shared COT (optionally, the COT shared by the second UE).

Optionally, when the above resource is a resource within another COT, when the (first and/or the second) UE calculates a time gap between a signalling carrying an indication (i.e., the signalling for indicating information of the resource) and the feedback signalling and/or a time gap between the PSSCH/PSCCH and the feedback signalling, only logical slots and/or slots within the COT are calculated, and furthermore, only logical slots and/or slots within a COT initiated by the first UE and/or slots within a COT shared to the first UE are calculated.

Figure 5:
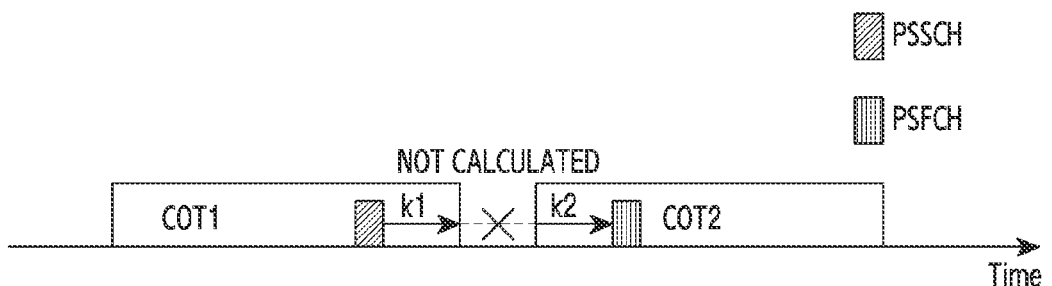
FIG. 5 illustrates a schematic diagram of a method for calculating a position of a resource for receiving/transmitting a feedback signalling according to an embodiment.

FIG. 5 provides a schematic diagram of this method, in which COT1 and COT2 are COTs initiated by the first UE and/or COTs shared to the first UE, and furthermore, COTs initiated by the first UE and/or COTs shared by the second UE. The gap between a slot where the PSSCH (which can also be replaced with the signalling for indicating information of the feedback resource) is located and the end position of COT1 includes a total of k1 slots, the gap between the start position of COT2 (which may or may not include the time gap used for LBT) and the slot where the PSFCH is located includes a total of k2 slots, wherein the k1 and k2 slots (which are assumed in this schematic diagram to be logical slots and are not specifically shown again) are counted in the time gap between the foregoing signalling that carries the indication and the feedback signalling and/or the time gap between the PSSCH/PSCCH and the feedback signalling. Several slots between COT1 and COT2 are not counted in this gap.

In a specific example, slots 0-100 are logical slots configured to the resource pool. The first UE initiates a COT-1 on a slot [0,20] and a COT-2 on a slot [31,50]. The first UE transmits SCI on a slot 18, indicating a feedback resource, wherein there is a time domain gap of 10 slots between the feedback resource and this SCI. When the first UE and the second UE calculate the position of the resource for receiving/transmitting the feedback signalling, if only the logical slots are calculated, the resource of the feedback signalling is at a slot 28. If only the logical slots and slots within COT initiated by the first UE and/or within a COT shared to the first UE are calculated, then slots [21,30] are not counted in the length of the time gap, and the obtained resource of the corresponding feedback signalling is at a slot 38.

The above embodiment provides a method for indicating at a first UE to a second UE a resource used by a feedback signalling through a dynamic signalling. Similarly, this method may also be used in the process of determining the resource used by the feedback signalling by the first UE and/or second UE according to a preset mapping rule (e.g., similar to methods on a licensed band). The following illustrates in connection with specific examples a method for determining the resource used by the feedback signalling on an unlicensed band based on the preset mapping rule. Slots can also be replaced with other time units in the following methods, such as OFDM symbols/symbol groups, minislots, and aggregated slots.

Optionally, when the PSSCH corresponding to the feedback signalling is at a slot n, according to the PSSCH-PSFCH mapping rule, the time domain position of the corresponding PSFCH is at the earliest slot containing the PSFCH resource (referred to as n1) that is after k slots meeting a specific condition after the slot n (or starting from the slot n). The specific condition includes at least one of the following:

the slot is a logical slot, that is, the slot is a slot configured to the resource pool used for transmitting the PSSCH;

the slot is in the current COT;

the slot is in a COT initiated by the first UE (optionally, in a COT initiated by the first UE and shared at least to the second UE); and the slot is in a COT shared by the first UE (optionally, in a COT initiated by the second UE and shared at least to the first UE).

A specific example is shown in FIG. 5, wherein a COT1 and a COT2 are COTs initiated by the first UE and/or COTs that are shared by the first UE, and k1 slots within the COT1 and k2 slots within the COT2 are logical slots, k=k1+k2. Therefore, the slot in which the PSFCH resource is located is the earliest slot containing the PSFCH resource after k slots that meet the above specific condition after the slot in which the PSSCH resource is located.

Optionally, the value of the number k of slots between PSSCH-PSFCH used when using the above method, and the value of the number k' of slots between PSSCH-PSFCH used when both the PSSCH and the PSFCH are in the same COT and a correspondence between resources is determined by a preset rule, may be values configured by the same field or different fields and may be the same or different values.

Optionally, when the above specific condition includes only that the k slots are logical slots, the value of the number of slots between PSSCH-PSFCH used is recorded as ka; when the above specific condition includes that the k slots are logical slots and that the k slots are in the current COT/the COT initiated by the first UE/the COT shared by the first UE, the value of the number of slots between PSSCH-PSFCH used is recorded as kb, then the values of ka and kb may be the same or different. In a specific example, the value of kb may reuse the value from the prior art on a licensed band, or be acquired from configuration sl-Min TimeGapPSFCH in the prior art on a licensed band; and/or, the value of kb is the same as the value of k' (k' is the number of slots between PSSCH-PSFCH used when both the PSSCH and the PSFCH are in the same COT and the correspondence between resources is determined by a preset rule), or acquired through a same configuration field. This is because when resources that are not in the COT are not counted in the above time gap, even if the PSSCH and the PSFCH span across different COTs, a one-to-one mapping relation can still be achieved without causing additional conflicts, so existing criteria can be reused as much as possible to be compatible with current technology. Values of ka may be larger new values, including a specific value (e.g., a specific positive integer) or a non-numeric value so that the UE can perform LBT within this larger time gap to initiate a new COT (e.g., COT2 in FIG. 5) and transmit a feedback signalling in the new COT. Optionally, the meaning for indicating the non-numeric value includes the first UE and/or the second UE additionally indicates in the new COT the position of the resource of the feedback signalling, for example, dynamically indicates by the other methods described above.

Optionally, the above method for determining a resource used by a feedback signalling on an unlicensed band based on a preset mapping rule described above is used when at least one of the following conditions is met, and/or a new value/new configuration field for the number of slots between the PSSCH-PSFCH is used when at least one of the following conditions is met:

a feature of dynamically indicating a feedback resource is not configured by a higher layer and/or enabled for the first UE and/or second UE;

the second UE does not indicate in the sidelink signal/channel (e.g., SCI, a MAC CE) that the second UE is configured and/or enabled for the feature of dynamically indicating the feedback resource;

the first UE and/or the second UE operates on an unlicensed band;

the first UE and/or the second UE is not configured to be able to use an LBT-free short control signalling (SCS);

the feedback signalling and/or data corresponding to the feedback signalling is transmitted on an unlicensed band;

a position of a PSSCH corresponding to the feedback signalling is later than a specific time; and furthermore, a gap from the position of the PSSCH to the end of COT does not exceed a specific length;

a position of a PSFCH to which a PSSCH corresponding to the feedback signalling is mapped through a predetermined rule exceeds the end position of the COT;

a position of a PSFCH to which a PSSCH corresponding to the feedback signalling is mapped through a predetermined rule exceeds the end position of the COT, and a gap between the position of the PSFCH and the end position of COT conforms to a predetermined threshold range; and the PSSCH corresponding to the feedback signalling cannot acquire the corresponding PSFCH resource or the corresponding PSFCH resource within the COT through mapping based on a method on a licensed band. As an example, the position of the PSFCH resource obtained by mapping of the PSSCH is outside the COT. As another example, not a complete PSFCH cycle is contained within the end of COT, that is, the PSSCH resource on the last several slots at the end of the COT does not have the corresponding PSFCH resource. As yet another example, the PSFCH resource is not configured in the resource pool.

Optionally, the first UE indicates to the second UE information of the resource used by the second UE to transmit a feedback signalling to the first UE, and if the first UE and/or the second UE finds that there are other transmissions and/or receptions from the first UE/second UE/another UE at the position of the resource, that is, a conflict has occurred, at least one of the following is applied:

if the resources used by other transmissions and/or receptions is determined according to a fixed mapping rule (e.g., resources used by other PSFCH transmissions are determined by a PSSCH-PSFCH mapping rule on a licensed band), the transmissions and/or receptions of which resources is determined according to the fixed mapping rule are prioritized, the transmission and/or reception of the feedback signalling is dropped, and/or the dynamically indicated resource for transmitting a feedback signalling is reselected; and transmission and/or reception of a signalling whose priority is not the highest in conflicting signallings is dropped based on priorities, wherein the priority of the feedback signalling is determined based on the corresponding PSSCH (e.g., determined by a method on a licensed band). If the dropped transmission is a transmission of the feedback signalling whose resource information is dynamically indicated by the first UE, the resource used to transmit the feedback signalling can also be reselected.

Optionally, the feedback signalling received by the first UE, or the feedback signalling sent by the second UE, includes at least one of the following:

a feedback signalling transmitted on a resource determined according to a mapping rule on a licensed band; and a feedback signalling transmitted on a resource determined according to the above information indicated by the first UE.

Optionally, if the first UE transmits a signalling for indicating information of a resource to the second UE, wherein the resource is used by the second UE to transmit a feedback signalling to the first UE, then the feedback signalling received by the first UE, i.e., the feedback signalling sent by the second UE, includes at least one of the following:

a feedback signalling transmitted on a resource determined according to a mapping rule on a licensed band; and a feedback signalling transmitted on a resource determined according to the above information indicated by the first UE.

Optionally, when the feedback signalling received by the first UE and sent by the second UE includes both a HARQ-ACK feedback transmitted on a PSFCH resource determined according to a mapping rule on a licensed band, and a HARQ-ACK feedback transmitted on a resource determined by the above information indicated by the first UE, at least one of the following ways is applied:

a 1-bit HARQ-ACK feedback is indicated on a PSFCH resource determined according to a mapping rule on a licensed band, which may be any of the following: a HARQ-ACK feedback for a PSSCH transmitted on a PSSCH resource corresponding to the PSFCH resource, and a bundled HARQ-ACK feedback corresponding to all HARQ-ACK feedbacks need to be provided to the first UE; and a 1-bit or N-bit HARQ-ACK feedback is indicated on a resource determined according to the above information indicated by the first UE, wherein the feedback may be any of the following: a bundled HARQ-ACK feedback corresponding to all HARQ-ACK feedback information that needs to be provided to the first UE, and a HARQ-ACK codebook corresponding to all HARQ-ACK feedback information that needs to be provided to the first UE.

FIG. 6 illustrates a flowchart of a method performed by a UE according to an embodiment. The method is used to dynamically indicate a resource of a feedback signalling in sidelink communication. The UE may be a first UE in the sidelink communication, wherein the first UE may transmit a PSSCH to a second UE, and may indicate to the second UE a resource of a feedback signalling of the PSSCH through a signalling. The method may include the following steps:

In Step 610, the first UE transmits to the second UE a signalling for indicating information of a resource, wherein the resource is used by the second UE to transmit a feedback signalling to the first UE, and In Step 630, the first UE receives the feedback signalling from the second UE, wherein the feedback signalling is sent to the first UE by the second UE using the resource.

The specific details involved in the method and other additional aspects have been described in detail with reference to Embodiment 1 above, and will not be described again here.

Embodiment 2

The present disclosure provides a group-based HARQ feedback method, wherein a first UE transmits a PSSCH to a second UE, and a feedback resource corresponding to the PSSCH is acquired through a preset mapping rule or information indicated by the first UE in the signalling, and the first UE receives a feedback signalling from the second UE on the resource. Accordingly, the second UE receives the PSSCH from the first UE, and acquires the feedback resource corresponding to the PSSCH through the preset mapping rule or the information indicated by the first UE in the signalling, and the feedback signalling is sent by the second UE to the first UE on the resource.

Optionally, the first UE transmits the PSSCH to the second UE and indicates information related to a HARQ-ACK feedback group in SCI associated with the PSSCH, and the information includes at least one of the following:

a PSSCH group indication, which indicates which group the current PSSCH belongs to, wherein 2 groups can be indicated by 1 bit, or N groups can be indicated by log 2(N) bits;

a sidelink-new feedback indication, which indicates whether the group is a new group, wherein the current group (that is, the group to which the PSSCH associated with the SCI belongs) can be indicated by 1 bit, or a total of 2 groups can be indicated by 2 bits, or a total of N groups can be indicated by N bits; and an indication of a request for a simultaneous feedback for multiple groups, wherein feedback of HARQ-ACK information of the current group or feedback of HARQ-ACK information of a total of 2 (or N) groups can be indicated by 1 bit, or whether to feedback HARQ-ACK information of each group in a total of N groups can be indicated through N bits.

Optionally, the first UE transmits the PSSCH to the second UE and indicates information related to a HARQ-ACK feedback in SCI associated with the PSSCH, wherein the information may further include at least one of the following:

whether a PSSCH-PSFCH mapping rule on a licensed band is used to determine the PSFCH resource used to transmit the HARQ-ACK feedback;

whether to use the information indicated dynamically by the first UE to determine the resource used to transmit the HARQ-ACK feedback; and when the HARQ-ACK feedbacks are grouped, whether the current group and/or each group and/or at least one group uses at least one of the above ways to determine the resource used to transmit the HARQ-ACK feedback.

Optionally, the first UE transmits a PSSCH to the second UE and indicates information related to a HARQ-ACK feedback in SCI associated with the PSSCH, including dynamically indicating information of the resource used by the second UE to transmit a feedback signalling to the first UE, as specifically detailed in Embodiment 1; and may further include indicating information of the resource based on a group. In particular, the SCI indicates information of the resource used to transmit a feedback signalling of the group to which the PSSCH belongs, and/or information indicating the resources of other groups or all groups for transmitting a feedback signalling. Accordingly, the second UE, after receiving the above information, transmits HARQ-ACK information on the indicated resource for the group for which information of the resource used to transmit feedback signalling is indicated. Based on this embodiment, the first UE may achieve group-based HARQ-ACK feedback of the second UE by indicating information related to HARQ-ACK feedback and/or information related to HARQ-ACK feedback group in the SCI associated with PSSCH. Thus, the feedback information of one group of UEs is indicated in one HARQ-ACK feedback, which improves feedback efficiency, and can indicate multiple HARQ-ACK feedbacks through the group, including indicating the feedbacks of other groups in the current group, thereby enhancing the reliability of HARQ-ACK feedback transmissions.

Those skilled in the art should understand that although the above describes examples where information related to HARQ-ACK feedback and/or information related to the HARQ-ACK feedback group is indicated by the SCI associated with the PSSCH, the information may also be indicated by other SCIs (including, but not limited to, SCI not associated with the PSSCH, stand-alone SCI, or the like) without departing from the scope of the present disclosure.

Figure 7:
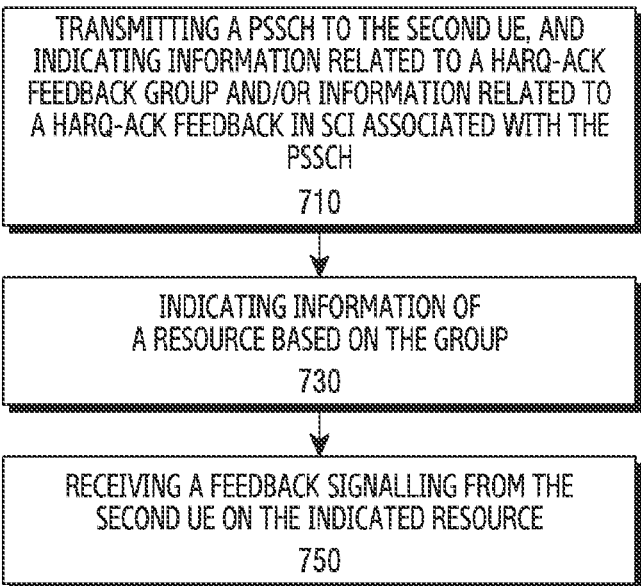
FIG. 7 illustrates a flowchart of a method performed by a UE according to an embodiment.

FIG. 7 illustrates a flowchart of a method performed by a UE according to an embodiment. The method is used to provide group-based HARQ feedback. The UE may be a first UE in sidelink communication. The method may include the following steps:

In Step 710, the first UE transmits a PSSCH to a second UE, and indicates information related to a HARQ-ACK feedback group and/or information related to a HARQ-ACK feedback in SCI associated with the PSSCH.

In Step 730, information of a resource is indicated based on the group.

In Step 750: a feedback signalling is received from the second UE on the indicated resource.

The specific details involved in the method and other additional aspects have been described in detail with reference to the Embodiment 2 above, and will not be described again here.

Embodiment 3

The present disclosure provides a method for determining a resource of a feedback signalling by dynamic indication, in which a signalling for indicating information of the resource is sent by a second UE to a first UE, wherein the resource is used by the second UE to transmit a feedback signalling to the first UE. Accordingly, the first UE receives from the second UE the signalling for indicating the information of the resource, and the resource is used to receive the feedback signalling from the second UE by the first UE. The second UE transmits the feedback signalling to the first UE based on the information of the resource. Accordingly, the first UE receives the feedback signalling from the second UE based on the information of the resource.

Specifically, the feedback signalling corresponds to data sent by the first UE to the second UE. Compared with Embodiment 1, it can be understood that in Embodiment 1, the feedback resource is indicated by a transmitting end UE of the data, and in Embodiment 3, the feedback resource is indicated by the receiving end UE of the data.

Optionally, the signalling for indicating the information of the resource includes SCI, and further includes a first-stage and/or second-stage SCI, the formats thereof include an existing SCI format and/or a new SCI format.

Optionally, the resource includes at least one of a PSCCH resource, a PSSCH resource, and a PSFCH resource.

In an embodiment, the first UE transmits a PSSCH to the second UE (for the sake of clarity, it is referred to as PSSCH-1), and the second UE transmits SCI for indicating the information of the resource to the first UE after receiving the PSSCH, wherein the resource is used by the second UE to transmit a feedback signalling to the first UE. The feedback signalling can be a feedback signalling of PSSCH-1.

Optionally, when at least one of the following conditions is met, the second UE transmits to the first UE a signalling for indicating information of the resource used by the second UE to transmit a feedback signalling to the first UE, and/or the first UE acquires the information of the resource used by the second UE to transmit the feedback signalling to the first UE through the signalling sent by the second UE:

a feature of dynamically indicating a feedback resource is configured by a higher layer and/or enabled for the first UE and/or second UE;

the first UE indicates in a sidelink signal/channel (e.g., SCI, a MAC CE) that the first UE is configured and/or enabled for the feature of dynamically indicating the feedback resource;

the first UE and/or the second UE operates on an unlicensed band;

the first UE and/or the second UE is not configured to be able to use an LBT-free short control signalling (SCS), and/or the first UE and/or the second UE is configured not to be able to use the SCS;

the feedback signalling and/or data corresponding to the feedback signalling is transmitted on an unlicensed band;

a position of a PSSCH corresponding to the feedback signalling is later than a specific time; and furthermore, a gap from the position of the PSSCH to the end of COT does not exceed a specific length;

a position of a PSFCH to which a PSSCH corresponding to the feedback signalling is mapped through a predetermined rule exceeds the end position of the COT;

a position of a PSFCH to which a PSSCH corresponding to the feedback signalling is mapped through a predetermined rule exceeds the end position of COT, and a gap between the position of the PSFCH and the end position of COT conforms to a predetermined threshold range;

the PSSCH corresponding to the feedback signalling cannot acquire the corresponding PSFCH resource or the corresponding PSFCH resource within the COT through mapping based on a method on a licensed band. As an example, the position of the PSFCH resource obtained by mapping of the PSSCH is outside the COT. As another example, not a complete PSFCH cycle is contained within the end of COT, that is, the PSSCH resource on the last several slots at the end of the COT does not have the corresponding PSFCH resource. As yet another example, the PSFCH resource is not configured in the resource pool;

the feedback signalling includes HARQ-ACK information; and further includes at least one NACK;

the second UE fails to receive the PSSCH from the first UE and feeds back a NACK, but fails to receive a retransmission of the PSSCH; and types of HARQ-ACKs (including ACK+NACK feedbacks for unicast, ACK+NACK feedbacks for multicast, NACK-only feedbacks for multicast/broadcast) are specific types.

Otherwise, the second UE uses the method on the licensed band to determine the resources used by the second UE to transmit the feedback signalling to the first UE; and/or the first UE uses the method on the licensed band to determine the resource used by the second UE to transmit the feedback signalling to the first UE. A specific example of the method is similar to that in Embodiment 1, except that the UE transmitting the information of the resource is replaced from the first UE in Embodiment 1 to the second UE in Embodiment 3.

Optionally, information indicated in the feedback signalling includes the HARQ-ACK information corresponding to the PSSCH-1 and/or another PSSCH. The specific content is similar to that in Embodiment 1, and will not be described again here.

Optionally, the first UE transmits a PSSCH to the second UE, and indicates in the SCI (which can be SCI associated with the PSSCH) that a feedback signalling corresponding to which of the PSSCHs described above should be sent by the second UE. The second UE generates the feedback signalling according to the information indicated by the SCI, selects the resource used to transmit the feedback signalling, indicates the selected resource to the first UE, and transmits the feedback signalling on the selected resource.

Optionally, the second UE transmits to the first UE a signalling for indicating the information of the resource, wherein the resource is used by the second UE to transmit a feedback signalling to the first UE, and the information includes which of the PSSCHs described above correspond to the feedback signalling, and furthermore, HARQ-ACK feedbacks correspond to which of the above PSSCHs are carried in the feedback signalling.

Optionally, the second UE transmits SCI for indicating information of the resource used by the second UE to transmit a feedback signalling to the first UE, including indicating the resource is used to transmit a feedback signalling corresponding to which of the above PSSCHs; and/or, the resource is used to transmit a feedback signalling corresponding to which of the above PSSCHs is predetermined and/or (pre)configured for the first UE and/or the second UE. In one specific example, the second UE indicates the information of the resource used by the second UE to transmit the feedback signalling to the first UE by using a specific SCI format, wherein the specific SCI format may be regarded as being used to distinguish whether the resource is used by the second UE to transmit a feedback signalling to the first UE or to transmit data/inter-UE collaboration information. In this specific SCI format, the second UE indicates the position of the resource used by the feedback signalling through one field and up to N PSSCH resources corresponding to the feedback signalling through another field. For example, the second UE indicates up to three PSSCH resources through the other field that reuses the design of the TDRA and FDRA domains on the licensed band, and the HARQ-ACK feedback of the three PSSCH resources is carried in this feedback signalling.

Optionally, when HARQ-ACK information corresponding to at least one PSSCH is indicated in the feedback signalling, the second UE indicates the HARQ-ACK information via a 1-bit information and/or via a codebook. The specific method (including the specific method for generating the codebook) is similar to that in Embodiment 1, and will not be described again.

Optionally, the feedback signalling indicates HARQ-ACK information via a sequence and/or SCI. The specific method (including a specific method for generating the codebook) is similar to that in Embodiment 1, and will not be described again.

Optionally, the content of information of the resource indicated by the second UE is similar to that in Embodiment 1, and will not be described again.

Optionally, the second UE indicates to the first UE information of a resource for transmitting a feedback signalling by the second UE to the first UE, including indicating in SCI, wherein the SCI includes at least one of SCI associated with at least one PSSCH corresponding to the feedback signalling, SCI associated with other PSSCHs not corresponding to the feedback signalling, and stand-alone SCI. The specific method is similar to that in Embodiment 1, and will not be described again here.

Optionally, the second UE indicates to the first UE information of the resource for transmitting a feedback signalling by the second UE to the first UE, wherein the resource may include at least one of the following:
a resource within the current COT (i.e., the COT within which the information is indicated); a resource outside the current COT; a resource within another COT; a resource within N starting slots of the COT (wherein N is a preset/(pre)configured parameter, e.g., N is sl-MinTimeGapPSFCH configured by a higher layer). Optionally, when the above resource is a resource within another COT, the (first and/or the second) UE calculates a time gap between the signalling carrying the indication and the feedback signalling, only the logical slots and/or the slots within the COT are calculated, and furthermore, only the logical slots and/or slots within a COT initiated by the first UE and/or slots within a COT shared to the first UE are calculated. The specific method is similar to that in Embodiment 1, and will not be described again here.

Optionally, the second UE indicates to the first UE information of a resource used by the second UE to transmit a feedback signalling to the first UE, and if the first UE and/or the second UE finds that there are other transmissions and/or receptions from the first UE/second UE/another UE at the position of the resource, that is, a conflict has occurred, at least one of the following may be applied:
if the resources used by other transmissions and/or receptions are determined according to a fixed mapping rule (e.g., resources used by other PSFCH transmissions are determined by a PSSCH-PSFCH mapping rule on a licensed band), the transmissions and/or receptions of which resources is determined according to the fixed mapping rule are prioritized, the transmission and/or reception of the feedback signalling is dropped, and/or the dynamically indicated resource for transmitting a feedback signalling is reselected; and transmission and/or reception of a signalling whose priority is not the highest in conflicting signallings is dropped based on priorities, wherein the priority of the feedback signalling is determined based on the corresponding PSSCH (e.g., determined by a method on a licensed band). If the dropped transmission is a transmission of the feedback signalling whose resource information is dynamically indicated by the first UE, then the resource used to transmit the feedback signalling can also be reselected.

Optionally, the feedback signalling received by the first UE, or the feedback signalling sent by the second UE, includes at least one of the following:
a feedback signalling transmitted on a resource determined according to a mapping rule on a licensed band; and
a feedback signalling transmitted on a resource determined according to the above information indicated by the second UE.

Optionally, if the second UE transmits a signalling for indicating information of a resource to the first UE, wherein the resource is used by the second UE to transmit a feedback signalling to the first UE, then the feedback signalling received by the first UE, i.e., the feedback signalling sent by the second UE, includes at least one of the following:
a feedback signalling transmitted on a resource determined according to a mapping rule on a licensed band; and
a feedback signalling transmitted on a resource determined according to the above information indicated by the second UE.

Optionally, when the feedback signalling received by the first UE and sent by the second UE includes both a HARQ-ACK feedback transmitted on a PSFCH resource determined according to a mapping rule on a licensed band, and a HARQ-ACK feedback transmitted on a resource determined by the above information indicated by the second UE, at least one of the following methods is applied:

a 1-bit HARQ-ACK feedback is indicated on the PSFCH resource determined according to the mapping rule on a licensed band, which may be: a HARQ-ACK feedback for a PSSCH transmitted on a PSSCH resource corresponding to the PSFCH resource, and a bundled HARQ-ACK feedback corresponding to all HARQ-ACK feedback information need to be provided to the first UE; and a 1-bit or N-bit HARQ-ACK feedback is indicated on the resource determined according to the above information indicated by the second UE, wherein the feedback may be: a bundled HARQ-ACK feedback corresponding to all HARQ-ACK feedback information that needs to be provided to the first UE, and a HARQ-ACK codebook corresponding to all HARQ-ACK feedback information that needs to be provided to the first UE.

FIG. 8 illustrates a flowchart of a method performed by a UE according to an embodiment. The UE may be a second UE in sidelink communication. The second UE may receive a PSSCH from the first UE, and may indicate to the first UE a resource for a feedback signalling of the PSSCH through a signalling. The method may include the following steps:

In Step 810, the second UE transmits to the first UE a signalling for indicating information of the resource, wherein the resource is used by the second UE to transmit a feedback signalling to the first UE.

In Step 830, the second UE transmits the feedback signalling to the first UE, wherein the feedback signalling is sent by the second UE to the first UE by using the resource.

The specific details involved in the method and other additional aspects have been described in detail with reference to Embodiment 3 above, and will not be described again here.

Embodiment 4

On an unlicensed band, the transmitting end TX UE can only be considered to occupy a channel within the COT that has been initiated or shared, and transmits within the COT (after a short LBT). However, if a PSSCH near the end position of the COT acquires a PSFCH resource according to a PSSCH-PSFCH mapping rule on a licensed band, then the PSFCH resource will be located after the end position of the COT due to effects of the PSFCH cycle and the processing latency of decoding and feedback, so in general, it can be considered that the corresponding receiving end RX UE cannot directly use the PSFCH resource to transmit a HARQ-ACK feedback, and needs to re-perform a long LBT process and initiate a new COT. During this process, the time gap between PSSCH-PSFCH may not be sufficient for the RX UE to complete the LBT process for initiating the COT, and in addition the LBT of the RX UE may fail, both of which will cause the RX UE to be unable to transmit the PSFCH. Embodiment 1 provides some specific examples to illustrate this problem.

In the present disclosure, for the above problems, some additional solutions are provided. In order to avoid a situation where the RX UE cannot transmit the HARQ-ACK feedback by using the methods in the prior art to determine the resource used for transmitting the HARQ-ACK feedback, on a resource in COT that meets a specific condition, the first UE may transmit at least one of the following types of signals/channels:

a dummy signal, which does not need to be decoded by other UEs, and its content is determined by the UE implementation, which is used to maintain the occupancy of the channel and avoid losing the currently occupied COT due to no transmission for a continuous period of time;

a duplicate of a previously transmitted signal/channel, for example, a duplicate of a previously transmitted PSCCH and/or PSSCH;

a blind retransmission of a previously transmitted signal/channel, for example, a blind retransmission of a previously transmitted PSCCH and/or PSSCH;

a PSCCH and/or PSSCH without an enabled HARQ feature; and stand-alone SCI without an associated PSSCH, for example, in Embodiments 1 and 3, the SCI for indicating resource information and without an associated PSSCH.

Accordingly, on the resource that meets the specific condition in COT, the second UE can receive at least one of the above types of signals/channels.

Optionally, the difference between the duplicate and blind retransmission can be understood as the duplicate is exactly the same as the previously transmitted signal/channel (or can use a different redundancy version (RV), and the rest of the parameters are the same), while blind retransmission refers to multiple transmissions of the same TB without acquiring a HARQ-ACK feedback, and different blind retransmissions can use parameters such as different modulation and coding schemes (MCS), RVs, time-frequency resource sizes, and the like.

Optionally, on the resource that meets the specific condition, the first UE cannot transmit other types of signals/channels, or the first UE can determine whether other types of signals/channels can be sent according to a (pre)definition/(pre)configuration.

Optionally, the above specific condition includes at least one of the following:

a feature of dynamically indicating a feedback resource is not configured by a higher layer and/or enabled for the first UE and/or second UE;

the second UE does not indicate in the sidelink signal/channel (e.g., SCI, a MAC CE) that the second UE is configured and/or enabled for the feature of dynamically indicating the feedback resource;

the first UE and/or the second UE operates on an unlicensed band;

the signal/channel is transmitted on an unlicensed band;

the first UE and/or the second UE are not configured to be able to use an LBT-free short control signalling (SCS);

a position of a transmission resource of the signal/channel is later than a specific time; and furthermore, a gap from the position of the transmission resource to the end of COT does not exceed a specific length;

when the signal/channel includes a PSCCH and/or a PSSCH, the position of a PSFCH to which the PSCCH and/or PSSCH is mapped through a predetermined rule exceeds the end position of the COT;

when the signal/channel includes a PSCCH and/or PSSCH, the position of the PSFCH to which the PSCCH and/or PSSCH is mapped through the predetermined rule exceeds the end position of the COT, and a gap between the position of the PSFCH and the end position of the COT conforms to a predetermined threshold range; and when the signal/channel includes a PSCCH and/or PSSCH, the PSCCH and/or PSSCH cannot acquire the corresponding PSFCH resource or the corresponding PSFCH resource within the COT through mapping based on the method on the licensed band. As an example, the position of the PSFCH resource obtained by mapping of the PSSCH is outside the COT. As another example, not a complete PSFCH cycle is contained within the end of COT, that is, the PSCCH/ PSSCH resource on the last several slots at the end of the COT does not have the corresponding PSFCH resource. As yet another example, the PSFCH resource is not configured in the resource pool.

Optionally, a UE still needs to first determine that the above resource can be used as a transmission resource before transmitting on that resource. Methods for determining that the above resources can be used as transmission resources include a method based on base station scheduling (Mode 1), a method based on channel sensing (Mode 2), a method based on inter-UE coordination (IUC) information, or the like, and technologies on licensed bands can be reused, so they will not be described again here. By this embodiment, the first UE as a TX UE may avoid the situation that the second UE as an RX UE cannot use the method in the prior art to determine the resource used for transmitting HARQ-ACK feedback and thus cannot transmit the HARQ-ACK feedback by transmitting a signal/channel that does not need to be fed back and/or not transmit other signals/channels on the resource in the COT that meets specific condition.

FIG. 9 illustrates a flowchart of a method performed by a UE according to an embodiment. The UE may be a TX UE in sidelink communication.

This method is used to avoid a situation where RX UE cannot use the methods in the prior art to determine the resource used for transmitting the HARQ-ACK feedback, and thus cannot transmit the HARQ-ACK feedback. The method may include the following steps:

In Step 910, determining a resource in a COT that meets a specific condition.

In Step 930, on the resource that meets the specific condition, transmitting at least one of the following types of signals/channels:

a dummy signal;

a duplicate of a previously transmitted signal and/or channel;

a blind retransmission of a previously transmitted signal and/or channel;

a PSCCH and/or a PSSCH without an enabled HARQ feature; and stand-alone SCI without an associated PSSCH.

The specific details involved in the method and other additional aspects have been described in detail with reference to Embodiment 4 above, and will not be described again here.

Figure 10:
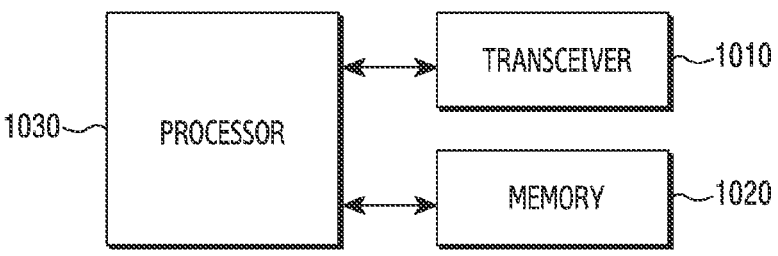
FIG. 10 illustrates a block diagram of a terminal (or a user equipment (UE)), according to an embodiment.

FIG. 10 illustrates a block diagram of a terminal (or a user equipment (UE)), according to an embodiment.

As shown in FIG. 10, a terminal may include a transceiver 1010, a memory 1020, and a processor (or a controller) 1030. The transceiver 1010, the memory 1020, and the processor 1030 of the terminal may operate according to a communication method of the terminal described above. However, the components of the terminal are not limited thereto. For example, the terminal may include more or fewer components than those described in FIG. 10. In addition, the processor 1030, the transceiver 1010, and the memory 1020 may be implemented as a single chip. Also, the processor 1030 may include at least one processor. Furthermore, the UE of FIG. 10 corresponds to UE 111, UE 112, UE 113, UE 114, UE 115, or UE 116 of FIG. 1.

The transceiver 1010 collectively refers to a terminal station receiver and a terminal transmitter, and may transmit/ receive a signal to/from a base station or another terminal. The signal transmitted or received to or from the terminal may include control information and data. The transceiver 1010 may include an RF transmitter for up-converting and amplifying a frequency of a transmitted signal, and an RF receiver for amplifying low-noise and down-converting a frequency of a received signal. However, this is only an example of the transceiver 1010 and components of the transceiver 1010 are not limited to the RF transmitter and the RF receiver.

Also, the transceiver 1010 may receive and output, to the processor 1030, a signal through a wireless channel, and transmit a signal output from the processor 1030 through the wireless channel.

The memory 1020 may store a program and data required for operations of the terminal. Also, the memory 1020 may store control information or data included in a signal obtained by the terminal. The memory 1020 may be a storage medium, such as a ROM, RAM, a hard disk, a compact disc-ROM (CD-ROM), and a digital versatile disc (DVD), or a combination of storage media.

The processor 1030 may control a series of processes such that the terminal operates as described above. For example, the processor 1030 may receive a data signal and/or a control signal, and the processor 1030 may determine a result of receiving the signal transmitted by the base station and/or the other terminal.

Figure 11:
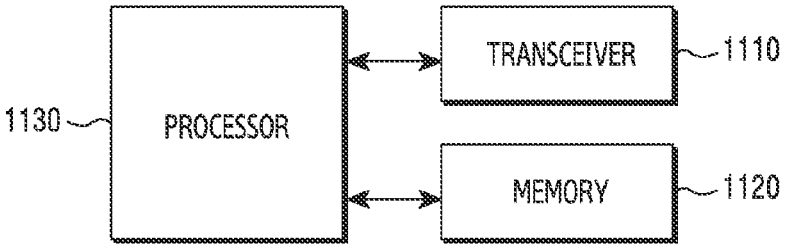
FIG. 11 illustrates a block diagram of a base station (BS), according to an embodiment.

FIG. 11 illustrates a block diagram of a base station, according to an embodiment.

As shown in FIG. 11, the base station may include a transceiver 1110, a memory 1120, and a processor (or a controller) 1130. The transceiver 1110, the memory 1120, and the processor 1130 of the base station may operate according to a communication method of the base station described above. However, the components of the base station are not limited thereto. For example, the base station may include more or fewer components than those described in FIG. 11. In addition, the processor 1130, the transceiver 1110, and the memory 1120 may be implemented as a single chip. Also, the processor 1130 may include at least one processor. Furthermore, the base station of FIG. 11 corresponds to the BS (e.g., BS 101, BS 102, or BS 103) of FIG. 1.

The transceiver 1110 collectively refers to a base station receiver and a base station transmitter, and may transmit/ receive a signal to/from a terminal, another base station, and/or a core network function(s) (or entity(s)). The signal transmitted or received to or from the base station may include control information and data. The transceiver 1110 may include an RF transmitter for up-converting and amplifying a frequency of a transmitted signal, and an RF receiver for amplifying low-noise and down-converting a frequency of a received signal. However, this is only an example of the transceiver 1110 and components of the transceiver 1110 are not limited to the RF transmitter and the RF receiver.

Also, the transceiver 1110 may receive and output, to the processor 1130, a signal through a wireless channel, and transmit a signal output from the processor 1130 through the wireless channel.

The memory 1120 may store a program and data required for operations of the base station. Also, the memory 1120 may store control information or data included in a signal obtained by the base station. The memory 1120 may be a storage medium, such as a ROM, RAM, a hard disk, a CD-ROM, and a DVD, or a combination of storage media.

The processor 1130 may control a series of processes such that the base station operates as described above. For example, the processor 1130 may receive a data signal and/or a control signal, and the processor 1130 may determine a result of receiving the signal transmitted by the terminal and/or the core network function.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executed by one or more processors in an electronic device. The one or more programs include instructions to execute the methods according to the embodiments described in the claims or the detailed description of the present disclosure.

The programs (e.g., software modules or software) may be stored in a RAM, a non-volatile memory including flash memory, a ROM), an electrically erasable programmable read-only memory (EEPROM), a magnetic disc storage device, CD-ROM, a DVD, another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to an embodiment. Another storage device on the communication network may also be connected to the apparatus performing the embodiments of the present disclosure.

In the afore-described embodiments of the present disclosure, elements included in the present disclosure are expressed in a singular or plural form. However, the singular or plural form is appropriately selected for convenience of explanation and the present disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this disclosure can be used, these features can be used in any other suitable system.

Those skilled in the art should understand that "user equipment" or "UE" herein may refer to any terminal capable of wireless communication, including but not limited to a mobile phone, a cellular phone, a smart phone, a PDA, a portable computer, an image capture device such as a digital camera, a gaming device, a music storage and playback device, and any portable unit or terminal capable of wireless communication, or Internet facilities allowing wireless Internet access and browsing or the like.

As used herein, the term "base station" (BS) or "network device" may refer to an eNB, an eNodeB, a NodeB or a base station transceiver (BTS) or a gNB and the like according to the technology and terminology used.

The "memory" herein may be any type suitable for the technical environment herein, and may be implemented using any suitable data storage technology, including but not limited to a semiconductor-based memory device, a magnetic memory device and system, an optical memory device and system, a fixed memory and a removable memory.

The processor herein may be any type suitable for the technical environment herein, including but not limited to one or more of the following: a general-purpose computer, a specialized computer, a microprocessor, a digital signal processor (DSP), and a processor based on a multicore processor architecture.

The above description provides various embodiments of the present disclosure and is not intended to limit the present disclosure. Any modification, equivalent replacement, improvement, and the like made within the spirit and principle of the present disclosure shall fall within the patentable scope of the present disclosure.

Those skilled in the art may understand that the present disclosure relates to devices for performing one or more of the operations described in the present disclosure. These devices can be specifically designed and manufactured for the desired purpose, or they can also include known devices found in general-purpose computers. These devices have computer programs stored within them, which are selectively activated or reconstructed. Such computer programs may be stored in a device (e.g., a computer) readable medium or stored in any type of media suitable for storing electronic instructions and separately coupled to a bus, wherein the computer-readable medium includes, but is not limited to, any type of disk (including a floppy disk, a hard disk, an optical disk, a CD-ROM, and a magneto-optical disk), a ROM, a RAM, an erasable programmable read-only memory (EPROM), an EEPROM, a flash memory, a magnetic card, or a light card. That is, readable medium includes any medium that stores or transmits information in a form capable of being readable by a device (e.g., a computer).

Those skilled in the art may understand that each block in these structure diagrams and/or block diagrams and/or flow diagrams and combinations of blocks in these structure diagrams and/or block diagrams and/or flow diagrams may be implemented with computer program instructions. Those skilled in the art may understand that these computer program instructions may be provided to a processor of a general-purpose computer, a specialized computer or other programmable data processing methods for implementation, thereby performing the solution specified in one or more blocks in structure diagram and/or block diagram and/or flow diagram disclosed in the present disclosure by the processor of the computer or the other programmable data processing methods.

Those skilled in the art can recognize that the present disclosure can be implemented in other specific forms without changing the technical idea or essential features of the present disclosure. Therefore, it should be understood that the above embodiments are merely examples and are not limiting. The scope of the present disclosure is defined by the appended claims, rather than the detailed description. Therefore, it should be understood that all modifications or changes derived from the meaning and scope of the appended claims and their equivalents are within the scope of the present disclosure.

In the above embodiments of the present disclosure, all operations and steps may be selectively performed or may be omitted. Furthermore, the operations and steps in each embodiment need not be performed sequentially, and the order of operations and steps may vary.

While the present disclosure has been shown and described with reference to various embodiments of the present disclosure, those skilled in the art may appreciate that, without departing from the spirit and scope of the present disclosure as defined by the appended claims and their equivalents, variations may be made to the form and detail thereof.

What is claimed is:

1. A method performed by a first user equipment (UE) in a wireless communication system, the method comprising:

performing a channel access procedure for obtaining a channel occupancy time (COT);

determining whether a gap from a position of a physical sidelink shared channel (PSSCH) to an end of the COT does not exceed a specific length and whether a location of a physical sidelink feedback channel (PSFCH) corresponding to the PSSCH exceeds the end of the COT;

transmitting, to a second UE, a first signalling for dynamically indicating a resource for receiving a feedback signaling corresponding to the PSFCH based on a result of the determination; and receiving the feedback signalling from the second UE on the resource.

2. The method of claim 1, wherein a feature of dynamically indicating a feedback resource is configured or enabled for the first UE or the second UE, wherein the first UE or the second UE operates on an unlicensed band, wherein the first UE or the second UE is not configured to be able to use a short control signalling (SCS), wherein the feedback signalling or data corresponding to the feedback signalling is transmitted on an unlicensed band, and wherein the position of a physical sidelink shared channel (PSSCH) corresponding to the feedback signalling is later than a specific time.

3. The method of claim 1, wherein the feedback signalling comprises hybrid automatic repeat request-acknowledgment (HARQ-ACK) information corresponding to the PSSCH sent by the first UE to the second UE, wherein the PSSCH comprises a PSSCH associated with the signalling for indicating the information of the resource.

4. The method of claim 3, wherein the feedback signalling further comprises HARQ-ACK information corresponding to at least one other PSSCH transmitted by the first UE to the second UE, and the at least one other PSSCH comprises at least one PSSCH transmitted before the PSSCH or will be transmitted after the PSSCH.

5. The method of claim 1, wherein information indicated in the feedback signalling comprises at least one of:

hybrid automatic repeat request-acknowledgment (HARQ-ACK) information corresponding to each or at least one PSSCH indicated in a physical sidelink control channel (PSCCH) or sidelink control information (SCI) associated with a PSSCH sent by the first UE to the second UE, HARQ-ACK information for a PSSCH group to which the PSSCH sent by the first UE to the second UE belongs, HARQ-ACK information for each or at least one PSSCH group indicated in a PSCCH or SCI associated with the PSSCH sent by the first UE to the second UE, wherein the PSSCH sent by the first UE to the second UE comprises a PSSCH associated with the signalling for indicating the information of the resource, HARQ-ACK information corresponding to each or at least one sidelink HARQ process of the second UE, or HARQ-ACK information corresponding to each or at least one PSSCH sent by the first UE to the second UE.

6. A first user equipment (UE) in a wireless communication system, the first UE comprising:

a transceiver; and a processor connected to the transceiver and configured to:

perform a channel access procedure for obtaining a channel occupancy time (COT), determine whether a gap from a position of a physical sidelink shared channel (PSSCH) to an end of the COT does not exceed a specific length and whether a location of a physical sidelink feedback channel (PSFCH) corresponding to the PSSCH exceeds the end of the COT, transmit, to a second UE, a first signalling for dynamically indicating a resource for receiving a feedback signaling corresponding to the PSFCH based on a result of the determination, and receive the feedback signalling from the second UE on the resource.

7. The first UE of claim 6, wherein a feature of dynamically indicating a feedback resource is configured or enabled for the first UE or the second UE, wherein the first UE or the second UE operates on an unlicensed band, wherein the first UE or the second UE is not configured to be able to use a short control signalling (SCS), wherein the feedback signalling or data corresponding to the feedback signalling is transmitted on an unlicensed band, and wherein the position of a physical sidelink shared channel (PSSCH) corresponding to the feedback signalling is later than a specific time.

8. The first UE of claim 6, wherein the feedback signalling comprises: hybrid automatic repeat request-acknowledgment (HARQ-ACK) information corresponding to the PSSCH sent by the first UE to the second UE, wherein the PSSCH comprises a PSSCH associated with the signalling for indicating the information of the resource.

9. The first UE of claim 8, wherein the feedback signalling further comprises: HARQ-ACK information corresponding to at least one other PSSCH transmitted by the first UE to the second UE, and the at least one other PSSCH comprises at least one PSSCH transmitted before the PSSCH or will be transmitted after the PSSCH.

10. The first UE of claim 6, wherein information indicated in the feedback signalling comprises at least one of:

hybrid automatic repeat request-acknowledgment (HARQ-ACK) information corresponding to each or at least one PSSCH indicated in a physical sidelink control channel (PSCCH) or sidelink control information (SCI) associated with a PSSCH sent by the first UE to the second UE, HARQ-ACK information for a PSSCH group to which the PSSCH sent by the first UE to the second UE belongs, HARQ-ACK information for each or at least one PSSCH group indicated in a PSCCH or SCI associated with the PSSCH sent by the first UE to the second UE, wherein the PSSCH sent by the first UE to the second UE comprises a PSSCH associated with the signalling for indicating the information of the resource, HARQ-ACK information corresponding to each or at least one sidelink HARQ process of the second UE, or HARQ-ACK information corresponding to each or at least one PSSCH sent by the first UE to the second UE.

11. A method performed by a second UE in a wireless communication system, the method comprising:

performing a channel access procedure for obtaining a channel occupancy time (COT);

determining whether a gap from a position of a physical sidelink shared channel (PSSCH) to an end of the COT does not exceed a specific length and whether a location of a physical sidelink feedback channel (PSFCH) corresponding to the PSSCH exceeds the end of the COT;

receiving, from a first UE, a first signalling for dynamically indicating a resource for transmitting a feedback signaling corresponding to the PSFCH based on a result of the determination; and transmitting the feedback signalling to the first UE on the resource.

12. The method of claim 11, wherein a feature of dynamically indicating a feedback resource is configured or enabled for the first UE or second UE, wherein the first UE or the second UE operates on an unlicensed band, wherein the first UE or the second UE is not configured to be able to use a short control signalling (SCS), wherein the feedback signalling or data corresponding to the feedback signalling is transmitted on an unlicensed band, and wherein the position of a physical sidelink shared channel (PSSCH) corresponding to the feedback signalling is later than a specific time.

13. The method of claim 11, wherein the feedback signalling comprises: hybrid automatic repeat request-acknowledgment (HARQ-ACK) information corresponding to the PSSCH sent by the first UE to the second UE, wherein the PSSCH comprises a PSSCH associated with the signalling for indicating the information of the resource.

14. The method of claim 13, wherein the feedback signalling further comprises HARQ-ACK information corresponding to at least one other PSSCH transmitted by the first UE to the second UE, and the at least one other PSSCH comprises at least one PSSCH transmitted before the PSSCH or will be transmitted after the PSSCH.

15. The method of claim 11, wherein information indicated in the feedback signalling comprises at least one of:

hybrid automatic repeat request-acknowledgment (HARQ-ACK) information corresponding to each or at least one PSSCH indicated in a physical sidelink control channel (PSCCH) or sidelink control information (SCI) associated with a PSSCH sent by the first UE to the second UE, HARQ-ACK information for a PSSCH group to which the PSSCH sent by the first UE to the second UE belongs, HARQ-ACK information for each or at least one PSSCH group indicated in a PSCCH or SCI associated with the PSSCH sent by the first UE to the second UE, wherein the PSSCH sent by the first UE to the second UE comprises a PSSCH associated with the signalling for indicating the information of the resource;

HARQ-ACK information corresponding to each or at least one sidelink HARQ process of the second UE, or HARQ-ACK information corresponding to each or at least one PSSCH sent by the first UE to the second UE.

16. A second user equipment (UE) in a wireless communication system, the second UE comprising:

a transceiver; and a processor connected to the transceiver and configured to:

perform a channel access procedure for obtaining a channel occupancy time (COT), determine whether a gap from a position of a physical sidelink shared channel (PSSCH) to an end of the COT does not exceed a specific length and whether a location of a physical sidelink feedback channel (PSFCH) corresponding to the PSSCH exceeds the end of the COT, receive, from a first UE, a first signalling for dynamically indicating a resource for transmitting a feedback signalling corresponding to the PSFCH based on a result of the determination, and transmit the feedback signalling to the first UE on the resource.

17. The second UE of claim 16, wherein a feature of dynamically indicating a feedback resource is configured or enabled for the first UE or the second UE, wherein the first UE or the second UE operates on an unlicensed band, wherein the first UE or the second UE is not configured to be able to use a short control signalling (SCS), wherein the feedback signalling or data corresponding to the feedback signalling is transmitted on an unlicensed band, and wherein the position of a physical sidelink shared channel (PSSCH) corresponding to the feedback signalling is later than a specific time.

18. The second UE of claim 16, wherein the feedback signalling comprises hybrid automatic repeat request-acknowledgment (HARQ-ACK) information corresponding to the PSSCH sent by the first UE to the second UE, wherein the PSSCH comprises a PSSCH associated with the signalling for indicating the information of the resource.

19. The second UE of claim 18, wherein the feedback signalling further comprises HARQ-ACK information corresponding to at least one other PSSCH transmitted by the first UE to the second UE, and the at least one other PSSCH comprises at least one PSSCH transmitted before the PSSCH or will be transmitted after the PSSCH.

20. The second UE of claim 16, wherein information indicated in the feedback signalling comprises at least one of:

hybrid automatic repeat request-acknowledgment (HARQ-ACK) information corresponding to each or at least one PSSCH indicated in a physical sidelink control channel (PSCCH) or sidelink control information (SCI) associated with a PSSCH sent by the first UE to the second UE, HARQ-ACK information for a PSSCH group to which the PSSCH sent by the first UE to the second UE belongs, HARQ-ACK information for each or at least one PSSCH group indicated in a PSCCH or SCI associated with the PSSCH sent by the first UE to the second UE, wherein the PSSCH sent by the first UE to the second UE comprises a PSSCH associated with the signalling for indicating the information of the resource, HARQ-ACK information corresponding to each or at least one sidelink HARQ process of the second UE, or HARQ-ACK information corresponding to each or at least one PSSCH sent by the first UE to the second UE.

*   *   *   *   *